(12) United States Patent
Kuang et al.

(10) Patent No.: US 12,137,465 B2
(45) Date of Patent: Nov. 5, 2024

(54) USER EQUIPMENT AND BASE STATION INVOLVED IN CONTROL CHANNEL SIGNALING

(71) Applicant: Panasonic Intellectual Property Corporation of America, Torrance, CA (US)

(72) Inventors: Quan Kuang, Langen (DE); Hidetoshi Suzuki, Kanagawa (JP); Hongchao Li, Langen (DE); Rikin Shah, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 417 days.

(21) Appl. No.: 17/760,721

(22) PCT Filed: Oct. 28, 2020

(86) PCT No.: PCT/EP2020/080244
§ 371 (c)(1),
(2) Date: Mar. 15, 2022

(87) PCT Pub. No.: WO2021/089376
PCT Pub. Date: May 14, 2021

(65) Prior Publication Data
US 2022/0338178 A1 Oct. 20, 2022

(30) Foreign Application Priority Data
Nov. 8, 2019 (EP) .................................. 19208100

(51) Int. Cl.
*H04W 72/23* (2023.01)
*H04W 16/14* (2009.01)
*H04W 76/28* (2018.01)

(52) U.S. Cl.
CPC ........... *H04W 72/23* (2023.01); *H04W 16/14* (2013.01); *H04W 76/28* (2018.02)

(58) Field of Classification Search
None
See application file for complete search history.

(56) References Cited

U.S. PATENT DOCUMENTS 10,687,339 B2 * 6/2020 Babaei .................. H04W 72/23
10,757,710 B2 * 8/2020 Zhou ...................... H04W 72/21
(Continued)

OTHER PUBLICATIONS

3GPP, "3rd Generation Partnership Project; Technical Specification Group Radio Access Network; Study on NR-based access to unlicensed spectrum (Release 16)," 3GPP TR 38.889 V16.0.0, Dec. 2018 (34 pages).
(Continued)

*Primary Examiner* — Faiyazkhan Ghafoerkhan
(74) *Attorney, Agent, or Firm* — Seed IP Law Group LLP

(57) ABSTRACT

The present disclosure relates to a user equipment (UE) that comprises a processor that operates a monitoring function that involves monitoring of a downlink control channel of an unlicensed radio cell based on one of a plurality of groups of search space sets (SSS). The unlicensed radio cell operates in an unlicensed spectrum and is controlled by a base station that is in communication with the user equipment. Further, one of the plurality of groups of SSSs is configured to be a default group of SSSs. The processor determines one group of the plurality of SSS groups for performing the monitoring function, depending on the downlink control channel. The monitoring function is not performed during a non-monitoring time period. The processor determines to perform the monitoring function based on the default group of SSSs, when performing the monitoring function subsequent to the non-monitoring time period.

15 Claims, 14 Drawing Sheets

(56) References Cited

U.S. PATENT DOCUMENTS

| | | | |
|---|---|---|---|
| 10,784,944 B2* | 9/2020 | Cirik | H04W 56/0045 |
| 11,109,375 B2* | 8/2021 | Si | H04W 72/23 |
| 11,229,045 B2* | 1/2022 | Khoshnevisan | H04W 72/23 |
| 11,284,400 B2* | 3/2022 | Zhou | H04W 24/08 |
| 11,395,299 B2* | 7/2022 | Babaei | H04W 24/08 |
| 11,864,186 B2* | 1/2024 | Zhou | H04L 5/001 |
| 2019/0141695 A1* | 5/2019 | Babaei | H04W 56/0045 |
| 2019/0141742 A1* | 5/2019 | Zhou | H04L 5/0064 |
| 2019/0215048 A1* | 7/2019 | Cirik | H04W 76/19 |
| 2020/0196306 A1* | 6/2020 | Si | H04W 72/23 |
| 2020/0196346 A1* | 6/2020 | Khoshnevisan | H04L 1/08 |
| 2020/0305144 A1* | 9/2020 | Babaei | H04L 5/0064 |
| 2020/0383103 A1* | 12/2020 | Zhou | H04L 5/0064 |
| 2020/0412437 A1* | 12/2020 | Cirik | H04W 72/23 |
| 2021/0045147 A1* | 2/2021 | Zhou | H04L 5/0098 |
| 2021/0392641 A1* | 12/2021 | Si | H04L 5/0048 |
| 2022/0338178 A1* | 10/2022 | Kuang | H04W 52/0229 |
| 2022/0361022 A1* | 11/2022 | Cheng | H04L 5/0094 |
| 2022/0386373 A1* | 12/2022 | Thyagarajan | H04W 74/0816 |
| 2022/0394520 A1* | 12/2022 | Shokri Razaghi | H04W 74/0866 |
| 2023/0353220 A1* | 11/2023 | Cirik | H04W 24/08 |

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018. (39 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019 (368 pages).

3GPP, "3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.6.0, Jun. 2019 (133 pages).

3GPP, "3rd Generation Partnership Project; Technical Specification Group Radio Access Network; NR; Requirements for support of radio resource management (Release 15)," 3GPP TS 38.133 V16.0.0, Jun. 2019 (1001 pages).

3GPP, "3rd Generation Partnership Project; Technical Specification Group Radio Access Network; NR; Physical channels and modulation (Release 15)," 3GPP TS 38.211 V15.6.0, Jun. 2019 (97 pages).

3GPP, "3rd Generation Partnership Project; Technical Specification Group Radio Access Network; NR; Multiplexing and channel coding (Release 15)," 3GPP TS 38.212 V15.6.0, Jun. 2019 (101 pages).

3GPP, "3rd Generation Partnership Project; Technical Specification Group Radio Access Network; NR; Physical layer procedures for control (Release 15)," 3GPP TS 38.213 V15.7.0, Sep. 2019 (108 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019 (99 pages).

3GPP, "3rd Generation Partnership Project; Technical Specification Group Radio Access Network; NR; Medium Access Control (MAC) protocol specification (Release 15)," 3GPP TS 38.321 V15.7.0, Sep. 2019 (78 pages).

3GPP, "3rd Generation Partnership Project; Technical Specification Group Radio Access Network; NR; Radio Resource Control (RRC) protocol specification (Release 15)," 3GPP TS 38.331 V15.6.0, Jun. 2019 (519 pages).

ETSI EN 301 893 V2.1.1, "5 GHz RLAN; Harmonised Standard covering the essential requirements of article 3.2 of Directive 2014/53/EU," May 2017, 122 pages.

Extended European Search Report, dated May 13, 2020, for European Application No. 19208100.8 (9 pages).

International Search Report, mailed Jan. 14, 2021, for International Application No. PCT/EP2020/080244 (3 pages).

Nokia, Nokia Shanghai Bell, "On DL signals and channels," R1-1910602, Agenda Item: 7.2.2.1.2, 3GPP TSG RAN WG1 Meeting #98bis, Chongqing, China, Oct. 14-20, 2019. 17 pages.

Qualcomm Incorporated, "DL signals and channels for NR-U," R1-1911095, Agenda Item: 7.2.2.1.2, 3GPP TSG RAN WG1 Meeting #98bis, Chongqing, China, Oct. 14-20, 2019. 17 pages.

* cited by examiner

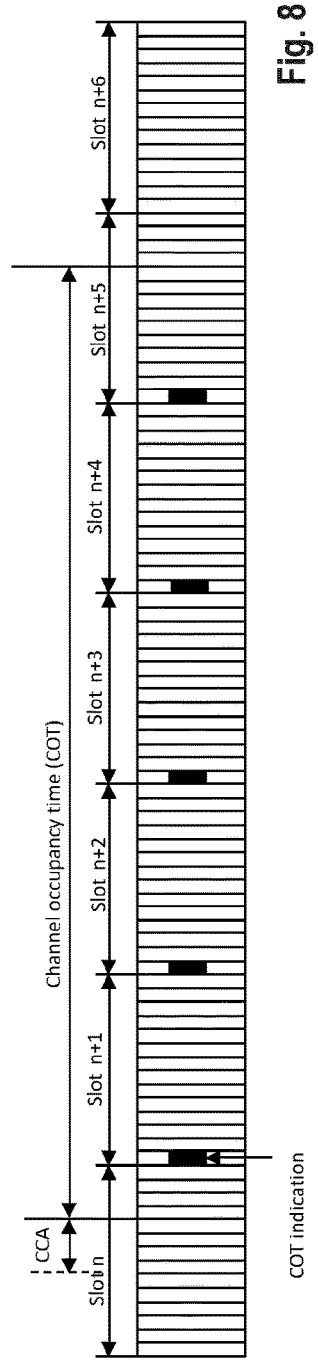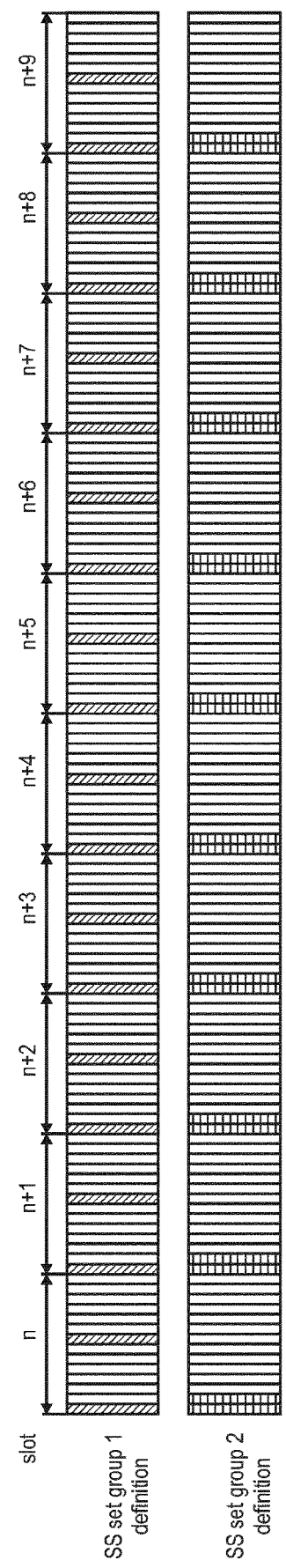

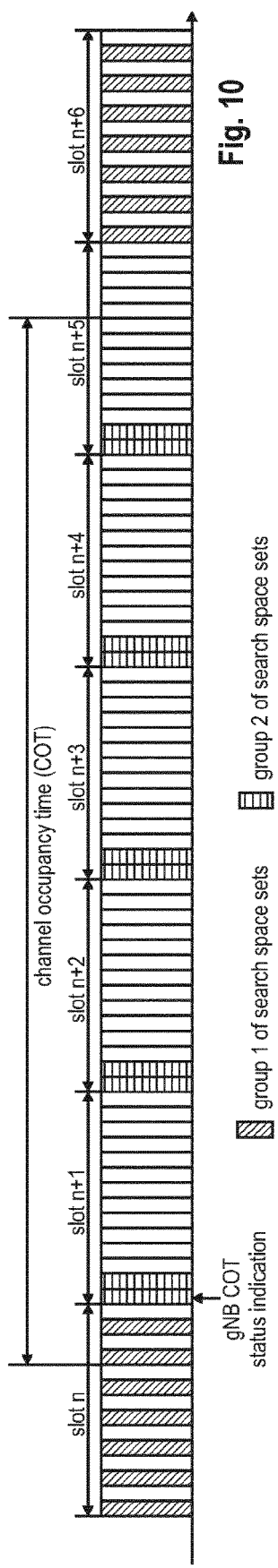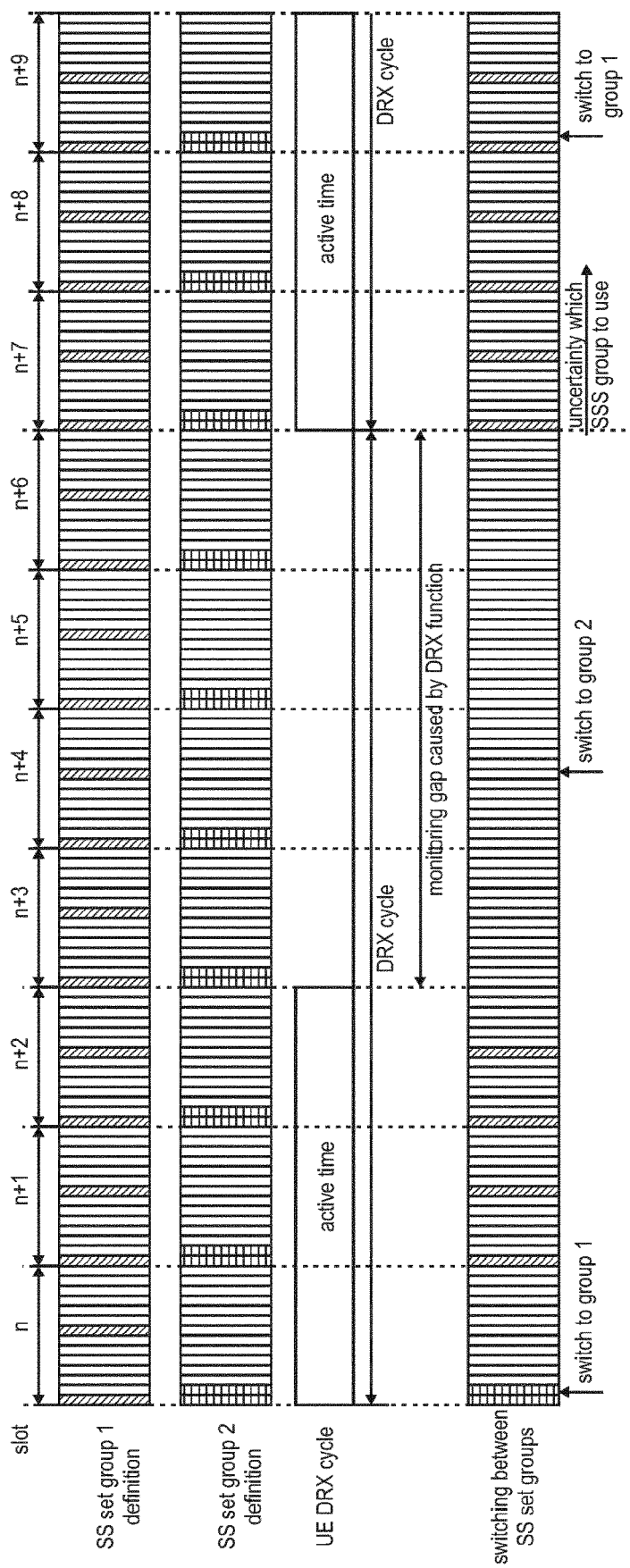

USER EQUIPMENT AND BASE STATION INVOLVED IN CONTROL CHANNEL SIGNALING

FIELD OF THE PRESENT DISCLOSURE

The present disclosure is directed to methods, devices and articles in communication systems, such as 3GPP communication systems.

TECHNICAL BACKGROUND

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

SUMMARY

One non-limiting and exemplary embodiment facilitates providing procedures for facilitating to improve a switching procedure for switching between groups of search space sets employed by a UE in a downlink control channel monitoring function and employed by a base station in a control information transmission function In an embodiment, the techniques disclosed here feature a user equipment comprising the following. A processor of the UE operates a monitoring function that involves monitoring of a downlink control channel of an unlicensed radio cell based on one of a plurality of groups of search space sets. The unlicensed radio cell operates in an unlicensed spectrum and is controlled by a base station that is in communication with the user equipment. Further, one of the plurality of groups of search space sets is configured to be a default group of search space sets. The processor determines one group of the plurality of search space sets groups for performing the monitoring function, depending on the downlink control channel. The monitoring function is not performed during a non-monitoring time period. The processor determines to perform the monitoring function based on the default group of search space sets, when performing the monitoring function subsequent to the non-monitoring time period.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE FIGURES

In the following exemplary embodiments are described in more detail with reference to the attached figures and drawings.

FIG. 8 illustrates the channel occupancy by a gNB of an unlicensed channel, and the corresponding transmission of a COT indication, FIG. 9 illustrates the configuration of search space sets in different SSS groups, FIG. 10 illustrates the switching between different SSS groups depending on the gNB's COT status, FIG. 11 illustrates one exemplary implementation of the SSS group switching operation for a UE, of the parallel operation of the DRX function as well as the resulting problem.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
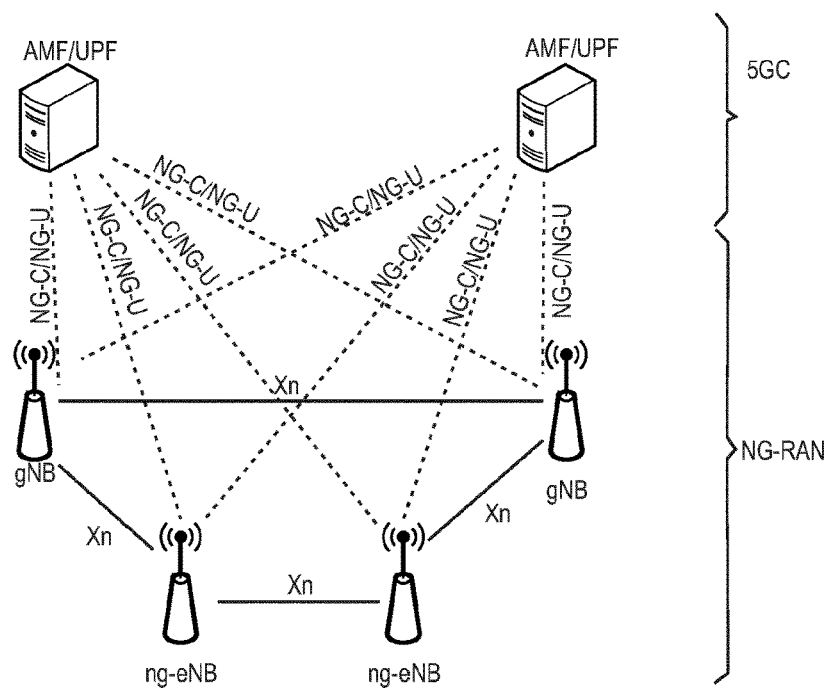
FIG. 1 shows an exemplary architecture for a 3GPP NR system.

Among other things, the overall system architecture assumes an NG-RAN (Next Generation-Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. For instance, the physical channels are PRACH (Physical Random Access Channel), PUSCH (Physical Uplink Shared Channel) and PUCCH (Physical Uplink Control Channel) for uplink and PDSCH (Physical Downlink Shared Channel), PDCCH (Physical Downlink Control Channel) and PBCH (Physical Broadcast Channel) for downlink.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0). For instance, downlink and uplink transmissions are organized into frames with 10 ms duration, each frame consisting of ten subframes of respectively 1 ms duration. In 5g NR implementations the number of consecutive OFDM symbols per subframe depends on the subcarrier-spacing configuration. For example, for a 15-kHz subcarrier spacing, a subframe has 14 OFDM symbols (similar to an LTE-conformant implementation, assuming a normal cyclic prefix). On the other hand, for a 30-kHz subcarrier spacing, a subframe has two slots, each slot comprising 14 OFDM symbols.

An overview is given by following tables from section 4 of TS 38.211 (version 15.6.0):

TABLE 4.2-1

Supported Transmission Numerologies.

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 4.3.2-1

Number of OFDM Symbols Per Slot, Slots Per Frame, and Slots Per Subframe for Normal Cyclic Prefix.

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

5G NR Functional Split Between NG-RAN and 5GC

Figure 2:
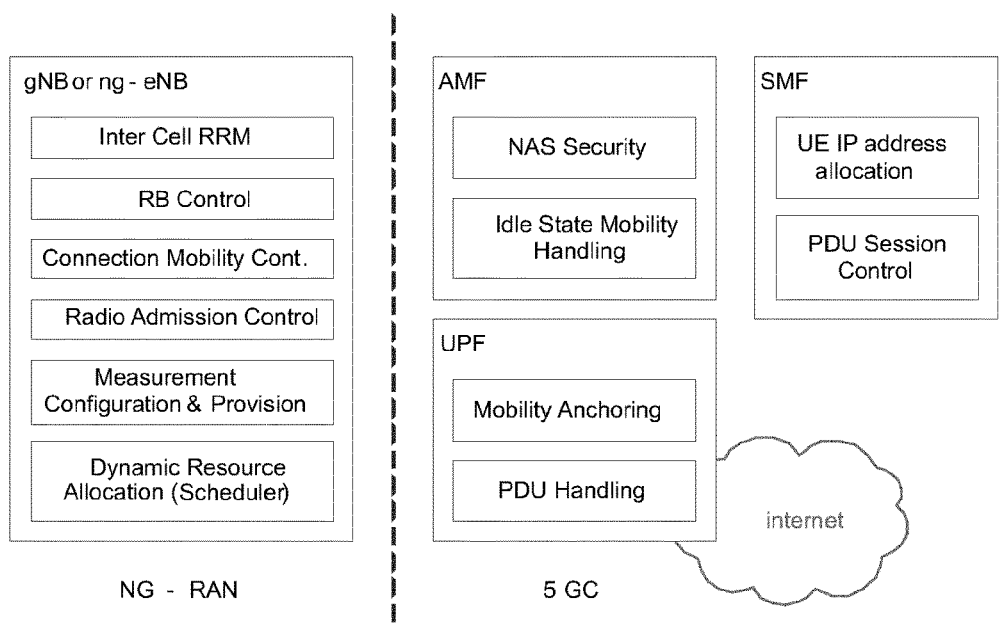
FIG. 2 is a schematic drawing that shows a functional split between NG-RAN and 5GC.

FIG. 2 illustrates functional split between NG-RAN and 5GC. NG-RAN logical node is a gNB or ng-eNB. The 5GC has logical nodes AMF, UPF and SMF.

In particular, the gNB and ng-eNB host the following main functions:
Functions for Radio Resource Management such as Radio Bearer Control, Radio Admission Control, Connection Mobility Control, Dynamic allocation of resources to UEs in both uplink and downlink (scheduling);
IP header compression, encryption and integrity protection of data;
Selection of an AMF at UE attachment when no routing to an AMF can be determined from the information provided by the UE;
Routing of User Plane data towards UPF(s);
Routing of Control Plane information towards AMF;
Connection setup and release;
Scheduling and transmission of paging messages;
Scheduling and transmission of system broadcast information (originated from the AMF or OAM);
Measurement and measurement reporting configuration for mobility and scheduling;
Transport level packet marking in the uplink;
Session Management;
Support of Network Slicing;
QoS Flow management and mapping to data radio bearers;
Support of UEs in RRC_INACTIVE state;
Distribution function for NAS messages;
Radio access network sharing;
Dual Connectivity;
Tight interworking between NR and E-UTRA.
The Access and Mobility Management Function (AMF) hosts the following main functions:
Non-Access Stratum, NAS, signalling termination;
NAS signalling security;
Access Stratum, AS, Security control;
Inter Core Network, CN, node signalling for mobility between 3GPP access networks;
Idle mode UE Reachability (including control and execution of paging retransmission);
Registration Area management;
Support of intra-system and inter-system mobility;
Access Authentication;
Access Authorization including check of roaming rights;
Mobility management control (subscription and policies);
Support of Network Slicing;
Session Management Function, SMF, selection.
Furthermore, the User Plane Function, UPF, hosts the following main functions:
Anchor point for Intra-/Inter-RAT mobility (when applicable);
External PDU session point of interconnect to Data Network;
Packet routing & forwarding;
Packet inspection and User plane part of Policy rule enforcement;
Traffic usage reporting;
Uplink classifier to support routing traffic flows to a data network;
Branching point to support multi-homed PDU session;
QoS handling for user plane, e.g., packet filtering, gating, UL/DL rate enforcement;
Uplink Traffic verification (SDF to QoS flow mapping);
Downlink packet buffering and downlink data notification triggering.
Finally, the Session Management function, SMF, hosts the following main functions.
Session Management;
UE IP address allocation and management;
Selection and control of UP function;
Configures traffic steering at User Plane Function, UPF, to route traffic to proper destination;
Control part of policy enforcement and QoS;
Downlink Data Notification.

RRC Connection Setup and Reconfiguration Procedures

Figure 3:
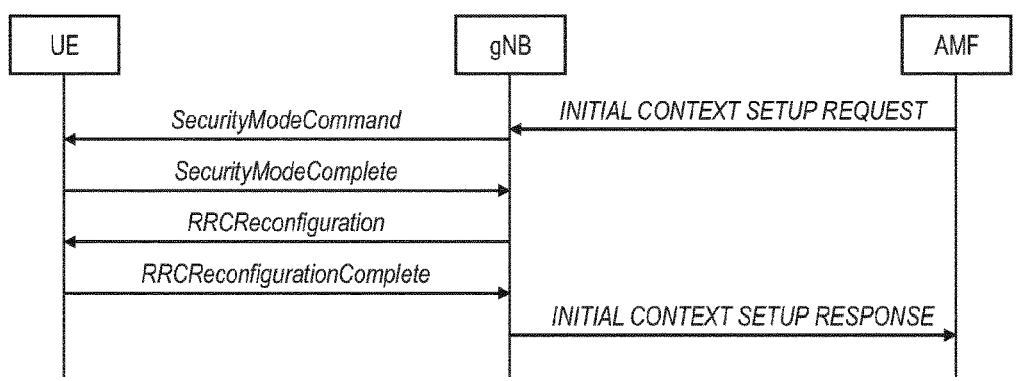
FIG. 3 is a sequence diagram for RRC connection setup/reconfiguration procedures.

FIG. 3 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signalling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 4:
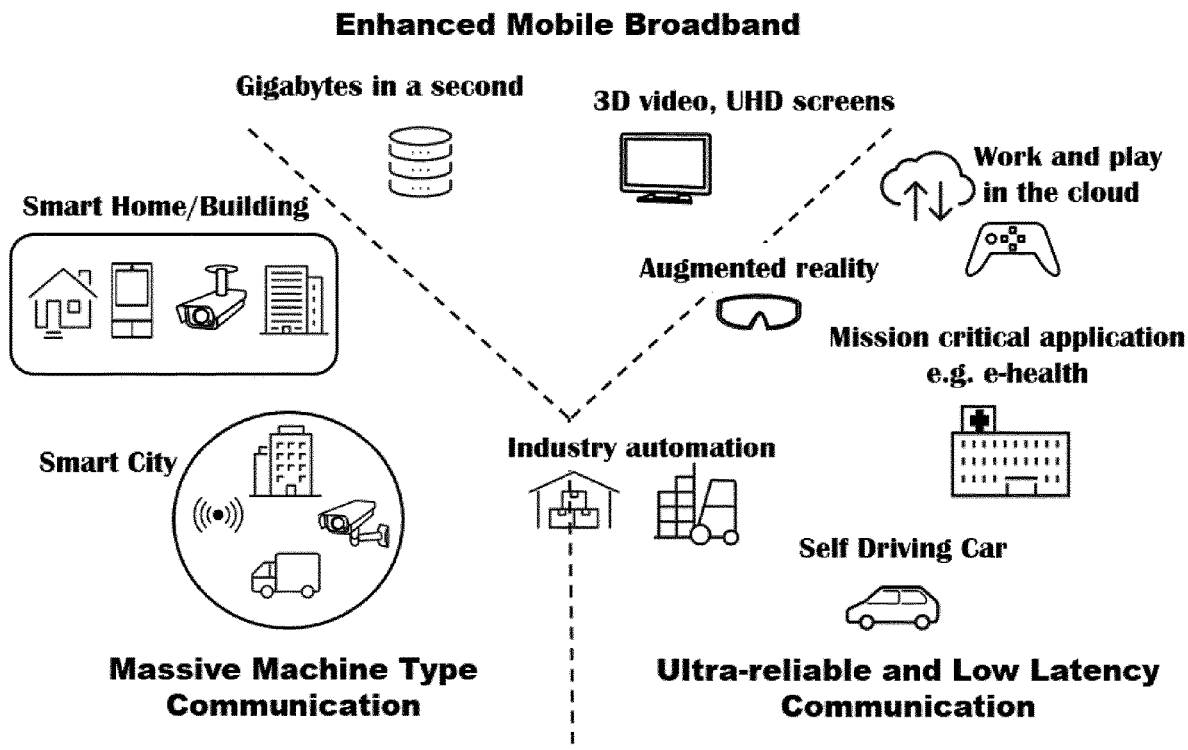
FIG. 4 is a schematic drawing showing usage scenarios of Enhanced mobile broadband (eMBB), Massive Machine Type Communications (mMTC) and Ultra Reliable and Low Latency Communications (URLLC)

FIG. 4 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 4 illustrates some examples of envisioned usage scenarios for IMT for 2020 and beyond (see, e.g., ITU-R M.20183 FIG. 2).

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to $10^6$ level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also, PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 3. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 5:
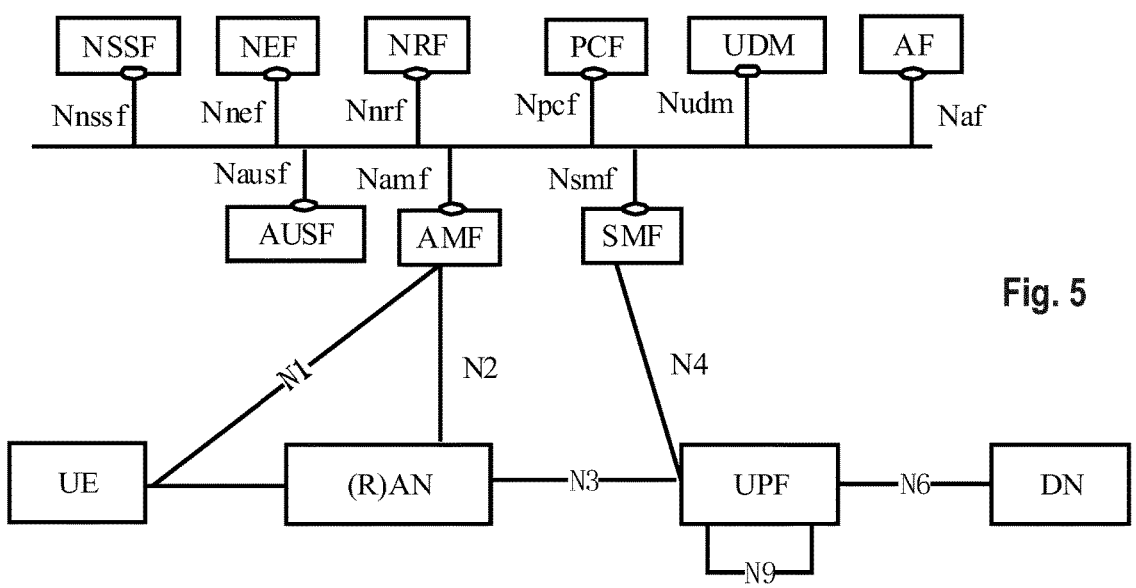
FIG. 5 is a block diagram showing an exemplary 5G system architecture for a non-roaming scenario.

FIG. 5 illustrates a 5G NR non-roaming reference architecture (see TS 23.501 v16.1.0, section 4.23). An Application Function (AF), e.g., an external application server hosting 5G services, exemplarily described in FIG. 4, interacts with the 3GPP Core Network in order to provide services, for example to support application influence on traffic routing, accessing Network Exposure Function (NEF)

or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 5 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services. All of or a part of the core network functions and the application services may be deployed and running on cloud computing environments.

In the present disclosure, thus, an application server (for example, AF of the 5G architecture), is provided that comprises a transmitter, which, in operation, transmits a request containing a QoS requirement for at least one of URLLC, eMBB and mMTC services to at least one of functions (for example NEF, AMF, SMF, PCF, UPF, etc.) of the 5GC to establish a PDU session including a radio bearer between a gNodeB and a UE in accordance with the QoS requirement and control circuitry, which, in operation, performs the services using the established PDU session.

Discontinued Reception. DRX, in LTE and 5G NR

An exemplary implementation of the discontinued reception (DRX) function in 5G NR that involves PDCCH monitoring, according to the currently standardized version, will be explained in a simplified and abbreviated form in the following.

To reduce the battery consumption in the UE, a mechanism to minimize the time the UE spends monitoring the PDCCH is used, which is called the Discontinuous Reception (DRX) functionality. DRX functionality can be configured for RRC_IDLE, in which case the UE uses either the specific or default DRX value (defaultPagingCycle); the default paging cycle is broadcasted in the System Information and can have values of 32, 64, 128 and 256 radio frames. The UE needs to wake up for one paging occasion per DRX cycle, the paging occasion being one subframe. DRX functionality can be also configured for an "RRC_CONNECTED" UE, so that it does not always need to monitor the downlink control channels for downlink control information (or phrased simply: the UE monitors the PDCCH) (see 3GPP Technical Standard TS 36.321, 15.6.0, chapter 5.7).

The following parameters are available to define the DRX UE behavior; e.g., the On-Duration periods at which the mobile node is active (i.e., in DRX Active Time), and the periods where the mobile node is in DRX (i.e., not in DRX Active Time).

On-duration: duration in downlink subframes, i.e., more in particular in subframes with PDCCH (also referred to as PDCCH subframe), that the user equipment, after waking up from DRX, receives and monitors the PDCCH. It should be noted here that the term "PDCCH" refers to the PDCCH, EPDCCH (in subframes when configured) or, for a relay node with R-PDCCH configured and not suspended, to the R-PDCCH. If the user equipment successfully decodes a PDCCH, the user equipment stays awake/active and starts the inactivity timer; [1-200 subframes; 16 steps: 1-6, 10-60, 80, 100, 200]

DRX inactivity timer: duration in downlink subframes that the user equipment waits to successfully decode a PDCCH, from the last successful decoding of a PDCCH; when the UE fails to decode a PDCCH during this period, it re-enters DRX. The user equipment shall restart the inactivity timer following a single successful decoding of a PDCCH for a first transmission only (i.e., not for retransmissions). [1-2560 subframes; 22 steps, 10 spares: 1-6, 8, 10-60, 80, 100-300, 500, 750, 1280, 1920, 2560]

DRX Retransmission timer: specifies the number of consecutive PDCCH subframes where a downlink retransmission is expected by the UE after the first available retransmission time. [1-33 subframes, 8 steps: 1, 2, 4, 6, 8, 16, 24, 33]

DRX short cycle: specifies the periodic repetition of the on-duration followed by a possible period of inactivity for the short DRX cycle. This parameter is optional. [2-640 subframes; 16 steps: 2, 5, 8, 10, 16, 20, 32, 40, 64, 80, 128, 160, 256, 320, 512, 640]

DRX short cycle timer; specifies the number of consecutive subframes the UE follows the short DRX cycle after the DRX Inactivity Timer has expired. This parameter is optional. [1-16 subframes]

Long DRX Cycle Start offset: specifies the periodic repetition of the on-duration followed by a possible period of inactivity for the DRX long cycle as well as an offset in subframes when on-duration starts (determined by formula defined in TS 36.321 section 5.7); [cycle length 10-2560 subframes; 16 steps: 10, 20, 30, 32, 40, 64, 80, 128, 160, 256, 320, 512, 640, 1024, 1280, 2048, 2560; offset is an integer between [0-subframe length of chosen cycle]]

The total duration that the UE is awake is called "Active time" or DRX Active Time. The Active Time, e.g., includes the on-duration of the DRX cycle, the time UE is performing continuous reception while the inactivity timer has not expired and the time UE is performing continuous reception while waiting for a downlink retransmission after one HARQ RTT. Similarly, for the uplink the UE is awake (i.e., in DRX Active Time) at subframes where uplink retransmission grants can be received over the PDCCH, i.e., every 8 ms after an initial uplink transmission until the maximum number of retransmissions is reached. Based on the above, the minimum Active Time is of fixed length equal to on-duration, and the maximum is variable depending on, e.g., the PDCCH activity.

The definition of Active Time in the 5G NR standard is given in TS 38.321, version 15.7.0 section 5.7:

When a DRX cycle is configured, the Active Time includes the time while:
drx-onDurationTimer or drx-InactivityTimer or drx-RetransmissionTimerDL or drx-RetransmissionTimerUL or ra-ContentionResolutionTimer (as described in clause 5.1.5) is running; or
a Scheduling Request is sent on PUCCH and is pending (as described in clause 5.4.4); or
a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

The "DRX period" or "DRX off period" is the duration of downlink subframes during which a UE can skip reception of downlink channels for battery saving purposes, i.e., is not required to monitor the downlink channels. The operation of DRX gives the mobile terminal the opportunity to deactivate the radio circuits repeatedly (according to the currently active DRX cycle) in order to save power. Whether the UE indeed remains in DRX (i.e., is not active) during the DRX period may be decided by the UE; for example, the UE usually performs inter-frequency measurements which cannot be conducted during the On-Duration, and thus need to be performed at some other time, e.g., during the DRX off time.

To meet conflicting requirements, two DRX cycles—a short cycle and a long cycle—can be configured for each UE; the short DRX cycle is optional, i.e., only the long DRX cycle could be used. The transition between the short DRX cycle, the long DRX cycle and continuous reception is controlled either by a timer or by explicit commands from the eNodeB. In some sense, the short DRX cycle can be considered as a confirmation period in case a late packet arrives, before the UE enters the long DRX cycle. If data arrives at the eNodeB while the UE is in the short DRX cycle, the data is scheduled for transmission at the next on-duration time, and the UE then resumes continuous reception. On the other hand, if no data arrives at the eNodeB during the short DRX cycle, the UE enters the long DRX cycle, assuming that the packet activity is finished for the time being.

During the Active Time, the UE monitors the PDCCH, reports SRS (Sounding Reference Signal) as configured and reports CQI (Channel Quality Information)/PMI (Precoding Matrix Indicator)/RI (Rank Indicator)/PTI (Precoder Type Indication) on PUCCH. When UE is not in Active time, type-0-triggered SRS and CQI/PMI/RI/PTI on PUCCH may not be reported. If CQI masking is set up for the UE, the reporting of CQI/PMI/RI/PTI on PUCCH is limited to the On-Duration subframes.

Figure 6:
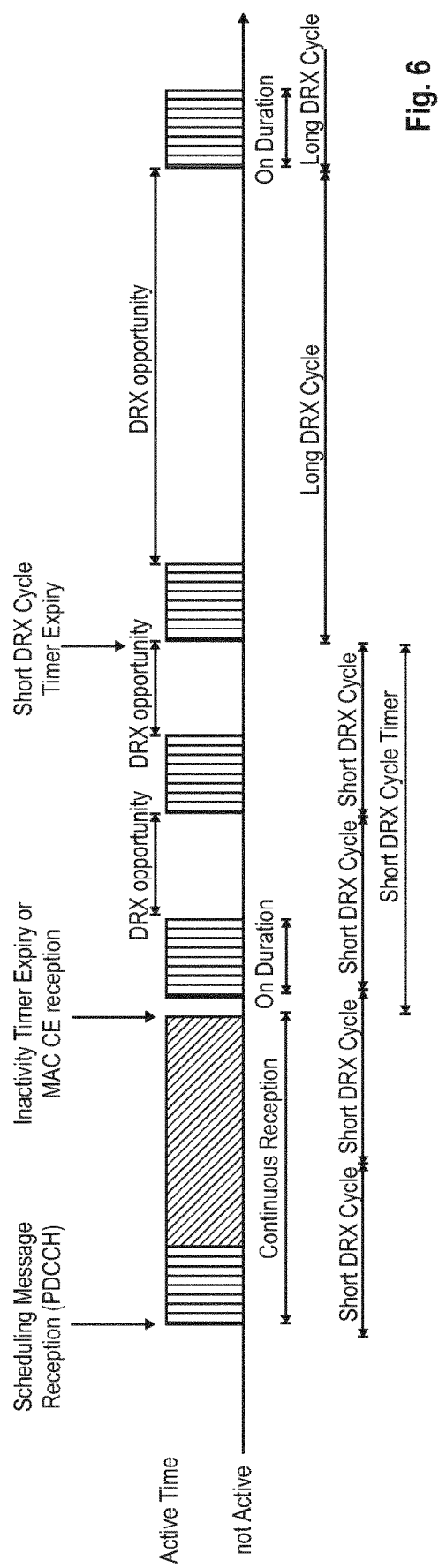
FIG. 6 illustrates the DRX operation of a mobile terminal, and in particular the DRX opportunity and on-duration periods, according to a short and long DRX cycle.

FIG. 6 discloses an example of a DRX operation. The UE checks for scheduling messages (can also be termed downlink/uplink assignment; e.g., indicated by its C-RNTI, cell radio network temporary identity, on the PDCCH) during the "on-duration" period, which is the same for the long DRX cycle and the short DRX cycle. When a scheduling message is received during an "on-duration period," the UE starts an "inactivity timer" and keeps monitoring the PDCCH in every subframe while the Inactivity Timer is running. During this period, the UE can be regarded as being in a "continuous reception mode." Whenever a scheduling message is received while the Inactivity Timer is running, the UE restarts the Inactivity Timer, and when it expires the UE moves into a short DRX cycle and starts a "short DRX cycle timer" (assuming a short DRX cycle is configured). When the short DRX cycle timer expires, the UE moves into a long DRX cycle. The short DRX cycle may also be initiated by means of a DRX MAC Control Element, which the eNB can send at any time to put the UE immediately into a DRX cycle, i.e., the short DRX cycle (if so configured) or long DRX cycle (in case the short DRX cycle is not configured).

The basic concepts for DRX as explained above for LTE also apply to the new 5G NR, with some differences. The standardization has progressed and defined DRX (see 3GPP TS 38.321 v05.6.0 section 5.7 titled "Discontinuous Reception (DRX)").

It should be noted that the term PDCCH may for instance refer to the PDCCH with common search space, or the PDCCH with the UE-specific search space, or even the GC-PDCCH (Group Common PDCCH) in the 5G NR. Therefore, conceptually the 5G-NR DRX mechanism works as illustrated in FIG. 6.

To summarize the above within the context of the improved concepts and aspects for the PDCCH monitoring as will be explained later, the UE monitors the PDCCH using timers to respectively control the On-Duration time as well as the DRX-inactivity time. While the corresponding timers are running, the UE is required to continue monitoring the PDCCH for the DRX operation.

RRM (Radio Resource Management) Measurements

Radio Resource Measurement (RRM) encompasses a wide range of techniques and procedures, including power control, scheduling, cell search, cell reselection, radio link or connection monitoring/measurements (see 3GPP TS 38.133 v16.0.0 "Requirements for support of radio resource management"). The RRC in NR 5G supports the following three states, RRC Idle, RRC Inactive, and RRC Connected (see section 4.2.1 of TS 38.331 v15.6.0). RRM techniques and reporting mechanism support mobility of the UE. RRM-related actions undertaken by the UE can be broadly divided based on the RRC state of the UE, e.g., the UE being in RRC_IDLE, RRC_INACTIVE, or in RRC_CONNECTED state.

For instance, for a UE in IDLE state, the RRM involves cell selection and cell reselection, while for a UE in INACTIVE state, the RRM involves cell reselection. Cell selection allows the UE to select a suitable cell where to camp on in order to access available services. Cell reselection allows the UE to select a more suitable cell to camp on.

One important aspect of cell selection and cell reselection is the radio measurements that the UE is required to perform for the serving cell and neighbouring cells. When camped on a cell, the UE shall regularly search for a better cell according to cell reselection criteria.

In brief to provide the basic outline of measurements, the UE (NR device) can perform measurements based on reference signals (such as CSI-RS, SS Blocks) and obtains measurement results therefrom. These can be used by the UE internally (e.g., cell (re)selection in IDLE or INACTIVE) or by other entities, such as the base station for mobility control (e.g., handover in CONNECTED), after having received some or all measurement results in a corresponding measurement report.

Measurements can be classified in at least three measurement types:
Intra-frequency NR measurements,
Inter-frequency NR measurements
Inter-RAT measurements Access to Unlicensed Spectrum In view of the objective to satisfy the ever-growing demand for wireless broad band communication, a "Study on NR-based Access to Unlicensed Spectrum" has been carried out (see, e.g., 3GPP TS38.889 v16.0.0). This study details various regulatory requirements for below 7 GHz band, e.g., 5 GHz and 6 GHz band unlicensed operation, and discusses different deployment scenarios. Further, design targets, functionalities and solutions are discussed, and performance evaluations are given.

The study identifies five possible deployment scenarios (see, e.g., 3GPP TS38.889 section 6 v.16.0.0), namely Scenario A: Carrier aggregation between licensed band NR (PCell) and NR-U (SCell) and/or NR-U SCell may have both DL and UL, or DL-only. Scenario B: Dual connectivity between licensed band LTE (PCell) and NR-U (PSCell) Scenario C: Stand-alone NR-U Scenario D: An NR cell with DL in unlicensed band and UL in licensed band, Scenario E: Dual connectivity between licensed band NR (PCell) and NR-U (PSCell).

Further, depending on region and band, regulatory requirements have to be taken into account. Such requirements may comprise dynamic frequency selection (DFS), transmit power control (TPC), Listen-Before-Talk (LBT) and discontinuous transmission with limited maximum transmission duration (may also be termed channel occupancy time, COT). All these requirements for different regions and bands at 5 GHz must be addressed on the system design level, recognizing that the scope is to create a single global solution framework for NR based access to unlicensed spectrum.

Listen-Before-Talk (LBT) for Unlicensed Spectrum

The listen-before-talk (LBT) procedure is defined as a mechanism by which devices perform a clear channel assessment (CCA) check before using a channel. According to one exemplary implementation, the CCA utilizes at least energy detection to determine the presence or absence of other signals on an unlicensed channel in order to determine if a channel is occupied or clear, respectively. European and Japanese regulations for instance mandate the usage of LBT in the unlicensed bands. Apart from regulatory requirements, this carrier sensing via LBT is one way for fair sharing of the unlicensed spectrum and is thus considered to be a vital feature for fair and friendly operation in the unlicensed spectrum in a single global solution framework.

In the unlicensed spectrum, the channel availability cannot always be guaranteed. In addition, certain regions such as Europe and Japan prohibit continuous transmissions and impose limits on the maximum duration of a transmission burst in the unlicensed spectrum (maximum channel occupancy). Hence, discontinuous transmission with limited maximum transmission duration is a functionality for 5G NR.

Following this European regulation on LBT, a device has to observe the channel for a certain minimum time (e.g., for Europe 20 μs, see ETSI 301 893, clause 4.8.3) during the CCA. The channel is considered occupied if the detected energy level exceeds a configured CCA threshold (e.g., for Europe, −73 dBm/MHz, see ETSI 301 893, clause 4.8.3), and conversely is considered to be free (clear) if the detected power level is below the configured CCA threshold. If the channel is determined as being occupied, it shall not transmit on that channel at this moment. Depending on the LBT category (e.g., Category 4 LBT as described below), the transmitter may perform CCA repeatedly, optionally with a backoff time in between, until the channel is identified as free. If the channel is classified as free, the equipment is allowed to transmit immediately. The maximum transmit duration is restricted in order to facilitate fair resource sharing with other devices operating on the same band.

Furthermore, the total time during which a device performs transmissions on a given carrier without re-evaluating the availability of that carrier (i.e., LBT/CCA) is defined as the channel occupancy time, COT, (see, e.g., ETSI 301 893, clause 4.8.3.1). The channel occupancy time shall be in the range of 1 ms to 10 ms, where the maximum channel occupancy time could be, e.g., 4 ms as currently defined for Europe.

Furthermore, there is a minimum Idle time the UE is not allowed to transmit after a transmission on the unlicensed cell, the minimum Idle time being at least 5% of the channel occupancy time. Towards the end of the Idle Period, the UE can perform a new CCA, and so on. Moreover, the CCA may not be required within a specific time period after receiving a signal by another entity, e.g., within 16 μs, as part of a shared COT. For instance, switching between DL and UL, and between UL and DL, within a shared gNB COT, does not require LBT.

To comply with this European Regulation on LBT, the 3GPP study (see 3GPP TS38.889, section 8.2 v.16.0.0) which is to classify the NR-based access for unlicensed spectrum into four different categories:

Category 1: Immediate transmission after a short switching gap. This is used for a transmitter to immediately transmit after a switching gap inside a COT. The switching gap from reception to transmission is to accommodate the transceiver turnaround time and is no longer than 16 μs.

Category 2: LBT without random back-off. The duration of time that the channel is sensed to be idle before the transmitting entity transmits is deterministic.

Category 3: LBT with random back-off with a contention window of fixed size. The LBT procedure has the following procedure as one of its components. The transmitting entity draws a random number N within a contention window. The size of the contention window is specified by the minimum and maximum value of N. The size of the contention window is fixed. The random number N is used in the LBT procedure to determine the duration of time that the channel is sensed to be idle before the transmitting entity transmits on the channel.

Category 4: LBT with random back-off with a contention window of variable size. The LBT procedure has the following as one of its components. The transmitting entity draws a random number N within a contention window. The size of contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel.

For different transmissions in a COT and different channels/signals to be transmitted, different categories of channel access schemes can be used.

Consequently, the operation on unlicensed radio cells requires any transmitter to perform Listen-Before-Talk as described above. This is also applies to the transmission of the PDCCH by the base station, and as a result can have also an impact on the PDCCH monitoring by the UE.

Many different functions operated by the UE (see above examples) involve monitoring the PDCCH and can thus be impacted by LBT failures of the gNB acquiring the unlicensed cell (can also be expressed: obtaining the unlicensed spectrum of the unlicensed radio cell).

COT Indication

In order to improve coordination between UEs and gNB in unlicensed operation, the gNB can transmit information in its radio cell about the channel occupancy status, e.g., when the gNB acquires the unlicensed channel and/or when the gNB stops occupying the unlicensed channel.

One example is shown in FIG. 8. Here, the gNB performs CCA at slot n before symbol #10 and identifies that the channel is free. Therefore, the gNB can acquire the channel immediately and send a PDCCH message to schedule UE data at symbol #10 if there are UEs configured to monitor PDCCH at symbol #10. On the other hand, in order for other non-scheduled UEs also to be aware of the fact that gNB has acquired the channel, gNB can send a COT indication, e.g., starting from the next slot boundary and repeated for each slot. Such repetition of the COT indication is advantageous because of two reasons. Firstly, it can improve the reliability. If UE has missed one COT indication, the UE can still have other opportunities to receive such an indication. Secondly, the repetition is also useful when the UE wakes-up in the middle of the COT due to the DRX operation. Since different UEs may have different DRX cycles, UEs can wake up at different points of time.

Although the complete set of information that would be carried in the COT indication is not concluded in 3GPP yet, two pieces of agreed-to-be-included information are relevant to the current disclosure and are discussed here. One is the COT duration bit-field, and the other one is the slot format indication (SFI) bit-field. Note that it is not required that both fields must be within the COT indication, either one is sufficient. Exemplarily, the presence of the fields is configurable by RRC signaling, as per 3GPP agreement.

The COT duration bit-field defines where the COT ends in the time domain, while the SFI bit-field defines which symbols are downlink, uplink and flexible, respectively. SFI bit-field can also be used to indicate that a slot is an "end-of-COT" slot or an "out-of-COT" slot.

In 3GPP, it is still open how the COT duration and SFI indication within COT indication can be updated. One option is that, once gNB has acquired the channel, it should decide on the COT duration and the SFI for the whole duration of the COT, and update or change is not allowed. In this sense, the multiple transmissions of the COT indication within the COT, as shown in FIG. 8, would carry the same information of COT duration and SFI.

The other option, which is more flexible in terms of the resource utilization, is to allow COT duration and SFI to be dynamically updated within the same COT. In this way, it is not needed for the gNB to plan the maximum COT duration and the corresponding SFI at the beginning of acquiring the channel. The gNB can plan one or a few slots ahead, and may decide later when to extend the COT to better adapt to the traffic variation. For example, in FIG. 8, in slot n+1, gNB sends COT indication to indicate SFI only for 3 slots starting from the current slot as follows, and not to indicate the COT duration:

DDDDDDDDDDDDDD; DDDDDDDDDDDDDD; DDDDDDDDDDDDDD;

In slot n+2, COT indication would again indicate 3 slots, starting from the current slot n+2, as follows.
DDDDDDDDDDDDDD; DDDDDDDDDDDDDD; FUUUUUUUUUUUUU;

Note that SFI for slot n+2 and slot n+3 are the same as indicated before, only the SFI for slot n+4 (new slot) is updated.

The gNB can keep such partially overlapping indication to extend the COT as needed, as long as it satisfies the maximum allowed COT duration. Once gNB decides that, for example, slot n+5 is the last slot of the current COT, in slot n+3, gNB can indicate the $3^{rd}$ slot from the current slot is the end of COT.

Control Information—Search Space Sets

PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has basically the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1). An overview is given by the following table.

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G NR, PDCCH is transmitted in radio resource regions called control resource sets (CORESETs). In LTE, the concept of a CORESET is not explicitly present. Instead, PDCCH in LTE uses the full carrier bandwidth in the first 1-3 OFDM symbols (four for the most narrowband case). By contrast, a CORESET in NR can occur at any position within a slot and anywhere in the frequency range of the carrier, except that the UE is not expected to handle CORESETs outside its active bandwidth part (BWP).

Accordingly, a UE monitors a set of PDCCH candidates in one or more CORESETs on the active DL BWP on each activated serving cell configured with PDCCH monitoring using the corresponding search space sets where monitoring implies decoding each PDCCH candidate according to the monitored DCI formats, e.g., as defined in 3GPP TS 38.213 version 15.7.0, sections 10 and 11.

In brief, a search space may comprise a plurality of PDCCH candidates associated with the same aggregation level (e.g., where PDCCH candidates differ regarding the DCI formats to monitor). In turn, a search space set may comprise a plurality of search spaces of different aggregation levels, but being associated with the same CORESET. Unlike in LTE, as mentioned above, where control channels span the entire carrier bandwidth, the bandwidth of a CORESET can be configured, e.g., within an active DL frequency bandwidth part (BWP). Put differently, the CORESET configuration defines the frequency resources for the search space set and thus for the comprised PDCCH candidates of search spaces in the set. The CORESET configuration also defines the duration of the search space set, which can have a length of one to three OFDM symbols. On the other hand, the start time is configured by the search space set configuration itself, e.g., at which OFDM symbol the UE starts monitoring the PDCCH of the search spaces of the set. In combination, the configuration of the search space set and the configuration of the CORESET provide an unambiguous definition in the frequency and time domain about the PDCCH monitoring requirements of the UE. Both CORESET and Search space set configurations can be semi-statically done via RRC signalling.

The first CORESET, CORESET 0, is provided by the master information block (MIB) as part of the configuration of the initial bandwidth part to be able to receive the remaining system information and additional configuration information from the network. After connection setup, a UE can be configured with multiple COTESETs using RRC signalling.

In NR, a flexible slot format can be configured for a UE by cell-specific and/or UE-specific higher-layer signaling in a semi-static downlink/uplink assignment manner, or by dynamically signaling via DCI Format 2_0 in the group-common PDCCH (GC-PDCCH). When the dynamic signaling is configured, a UE is to monitor the GC-PDCCH (DCI format 2_0) that carries the dynamic slot format indication (SFI).

For unlicensed operation, as already concluded upon the completion of Study Item (see 38.889, v16.0.0), in addition to the functionalities provided by DCI format 2_0 in Rel-15 NR, indication of the COT structure in the time domain has been identified as being beneficial. Therefore, NR-U UE can acquire the COT structure by decoding DCI format 2_0.

Search Space Set Group Switching

In 3GPP, the concept of configuring at least two groups of search space sets (abbreviated as SSS or SS set) for monitoring of the PDCCH has been discussed. This new concept can be, e.g., specifically useful for operation in the unlicensed radio spectrum, where the gNB has to first acquire the channel in order to then be allowed to transmit a PDCCH.

For instance, the different SSS groups can differ by when and/or how long the UE is required to monitor the PDCCH during a slot. This is exemplarily illustrated in FIG. 9. As apparent therefrom, two different groups of search space sets are configured where the group-1 SS set configuration requires PDCCH monitoring at a granularity of, e.g., every 7th OFDM symbol (see also mini-slot granularity of every second OFDM symbol in slot n of FIG. 10) and where the group-2 SS set configuration requires PDCCH monitoring at slot granularity (here, e.g., the first two OFDM symbols of every slot). The UE is required to at least monitor the search spaces of the currently active SSS group. Moreover, there may be search space sets that are not part of the configured groups (e.g., a common search space set) that will always be monitored by the UE regardless of the SSS indication.

The various groups may comprise various search space sets. A single search space set can be part of more than one SSS group.

According to one aspect of the concept, the UE can be configured to switch between the groups, based on at least the following alternatives.

A first alternative would involve an implicit configuration, e.g., by the UE detecting, e.g., a DL burst, a DM-RS (DeModulation Reference Signal), or a Wideband-DM-RS (WB-DM-RS), or a GC-PDCCH and/or a PDCCH and/or based on information on the COT structure. Here, it is exemplarily assumed that the UE derives the corresponding SSS group from the COT status of the gNB, e.g., when the UE is inside a COT of the gNB, the UE uses one particular SSS group, and when outside, the UE uses another particular SSS group. The beginning of the COT can be derived by the UE, e.g., from explicit information (see, e.g., above discussed COT indication) or implicitly from detection of a downlink transmission, such as one or more of the above-listed (DL burst, DM-RS, GC-PDCCH, PDCCH). On the other hand, the end of the COT can be derived by the UE, e.g., from a COT duration indication bit-field in GC-PDCCH (with DCI format 2_0) or from SFI bit-field in GC-PDCCH (with DCI format 2_0).

A second alternative so as to instruct the UE to switch to a particular SSS group would involve an explicit indication, e.g., a bit field in the GC-PDCCH and/or PDCCH that indicates the SSS group index that the UE needs to monitor. If the SSS group index is different than the current one in use, UE knows the SSS group needs to be switched, e.g., as from the next slot boundary. This allows the gNB to have full control of the SSS group used by the UE. For instance, the gNB may decide to switch the SSS group without the need for crossing the boundary of a COT (e.g., inside or outside a COT).

FIG. 10 illustrates an exemplary implementation of the SSS group switching when using an implicit indication based on the COT status. As apparent therefrom, it is exemplarily assumed that SSS group 1 (notably, group 1 here is to monitored every second symbol which is different than the example shown in FIG. 9) is used when outside the COT, and SSS group 2 is used when inside the COT. It is exemplarily assumed that the UE knows the COT status at the gNB, e.g., based on a COT status indication received in slot n. The COT status indication may optionally also indicate the COT duration, such that the UE knows already that the channel occupancy by the gNB ends with 9-th OFDM symbol of slot n+5.

In the above example, before COT, UE monitors PDCCH according to SSS group 1 configuration (here, e.g., at mini-slot granularity), which allows to increase the channel access possibility.

After COT is identified, starting from the next slot boundary, PDCCH monitoring is switched to group 2 (i.e., at slot granularity), which allows to reduce control overhead during the channel occupancy time.

After COT ends, PDCCH monitoring is switched back to SSS group 1 at the next slot boundary.

While only two different SSS groups are mentioned above, the UE may be configured with be more than two SSS groups. For instance, it may be advantageous to provide more than two SSS groups for wideband operation of the UE, such that different SSS groups correspond to different combinations of LBT bandwidths that have passed LBT. Another scenario where more than two SSS groups could be useful assumes that SSS group switching is done by following explicit instructions from the gNB, such that the gNB has more flexibility to apply the most suitable group of search space sets for a UE.

In 3GPP, no final agreements have been reached as a standardized method on how this switching can be instructed to the UE. Thus, the above alternatives are mere examples, and other ways of configuring the UE to switch between SSS groups may be possible as well.

Moreover, many details on how to implement this switching between different groups of search space sets are still open.

Consequently, the inventors have identified the possibility of completing and/or improving the mechanism of switching between different groups of search space sets for use in monitoring the PDCCHs.

The UE performs the PDCCH monitoring function, such as the one presented above, which involves the switching between different SSS groups.

In addition, however, the UE performs a DRX function, which alternates monitoring time periods during which the UE monitors the PDCCH with non-monitoring time periods during which the UE is allowed to sleep and not monitor the PDCCH. There are also other functions performed by the UE that create such non-monitoring time periods, during which the UE will not monitor the PDCCH. For instance, the UE may be configured to perform radio measurements, and while performing the radio measurements, the UE might not be able to monitor the PDCCH (e.g., when the reference signals for radio measurements are outside UE's active BWP, in which case a measurement gap without monitoring PDCCH is needed). As another example, the UE performs uplink transmissions, during which time the UE will not be able to monitor the PDCCH.

However, the switching between the SSS groups relies on the UE monitoring the PDCCH; either because an explicit indication is received via the (GC-)PDCCH, or implicitly because the UE derives the COT status of the gNB from downlink transmissions via the (GC)-PDCCH (see above discussion and current understanding in 3GPP). Thus, during and directly after such non-monitoring time periods, the UE may not know which SSS group it is supposed to use. This undefined UE behavior should be avoided.

This undefined UE behavior is illustrated in FIG. 11. As exemplarily assumed in FIG. 11, the UE is performing the PDCCH or GC-PDCCH monitoring function based on the SSS group 2, and is to change to SSS group 1 at slot n+1. To said end, the gNB may transmit an explicit instruction for the UE to switch to SSS group 1 using a PDCCH or GC-PDCCH in slot n (see arrow with "switch to group 1"). The UE is in DRX Active time, thus monitors the PDCCH or GC-PDCCH and is able to receive the instruction.

The UE enters a sleep period (can also be termed, e.g., non-monitoring time period or monitoring gap) comprising slots n+3 to n+6 according to the DRX cycle, during which the PDCCH or GC-PDCCH need not be monitored by the UE to save power. During the monitoring gap the UE will not know whether or not it missed a further SSS group switching instruction, especially if the switching is indicated by the GC-PDCCH to a group of UEs with various different DRX cycles configured (or if the explicit switching instruction is transmitted by the gNB at some other non-monitoring time period of the UE that is not known to the gNB). The UE thus does not know which SSS group it is supposed to use, when exiting the non-monitoring time period. For instance, as illustrated in FIG. 11, the gNB, in slot n+4 in an OFDM symbol, transmits a further instruction to switch back to SSS group 2 (e.g., using GC-PDCCH to a group of UEs). The UE shown in FIG. 11 in DRX OFF will miss such an instruction. The UE behavior regarding which SSS group to use for the PDCCH monitoring is thus undefined. In case that the instruction is sent via UE-specific PDCCH, there is still a chance, depending on the channel condition, that the PDCCH is not detected by the UE. Therefore, misalignment of the SSS group between gNB and UE can happen. In FIG. 11, it is exemplarily assumed that the UE continues to use the last SSS group used before the monitoring gap, i.e., SSS group 1. The gNB however may assume that the UE is using SSS group 2 as indicated during the monitoring gap, thus transmitting a further SSS group switching instruction in an OFDM symbol of slot n+9, actually not monitored by the UE. It would be beneficial that the potential misalignment can be confined within one DRX cycle. For example, there is a mechanism to periodically reset the usage of SSS groups.

Another problematic scenario will be discussed in the following with reference to FIG. 12. Similar to the scenario exemplarily assumed for FIG. 11, a monitoring gap is caused by the DRX function operated by the UE. Instead of transmitting the explicit instruction "switch to group 1" (see FIG. 11), the gNB may implicitly cause the UE to switch to group 1, because the SSS group switching by the UE follows the COT status of the gNB (see also discussion of FIG. 10). In the particular exemplary scenario of FIG. 12, it is assumed that the gNB acquired the unlicensed channel right at the beginning of slot n. The UE may become aware of the channel occupancy, e.g., by a corresponding COT status indication received via a PDCCH in the first or second OFDM symbol of slot n+1 (or in another way, such as by detection of a DL burst, or of a DM-RS, or of a WB-DM-RS, etc.). Thus, the UE switches to SSS group 1 as of the next slot boundary, i.e., here as of slot n+1.

During the monitoring gap (here caused by the DRX function), the UE will not be able to keep updated on the channel occupancy status of the gNB. Thus, the UE cannot distinguish between the two illustrated cases of the gNB COT status at the bottom of FIG. 12, where in case 1, the gNB continues to occupy the unlicensed channel during the monitoring gap, and wherein in case 2, the gNB stops to occupy the unlicensed channel during the monitoring gap. When becoming active again, after the monitoring gap, the UE thus does not know which SSS group it is to use, because it does not know whether it is inside or outside a channel occupancy by the gNB. Such undefined UE behavior is disadvantageous.

Figure 12:
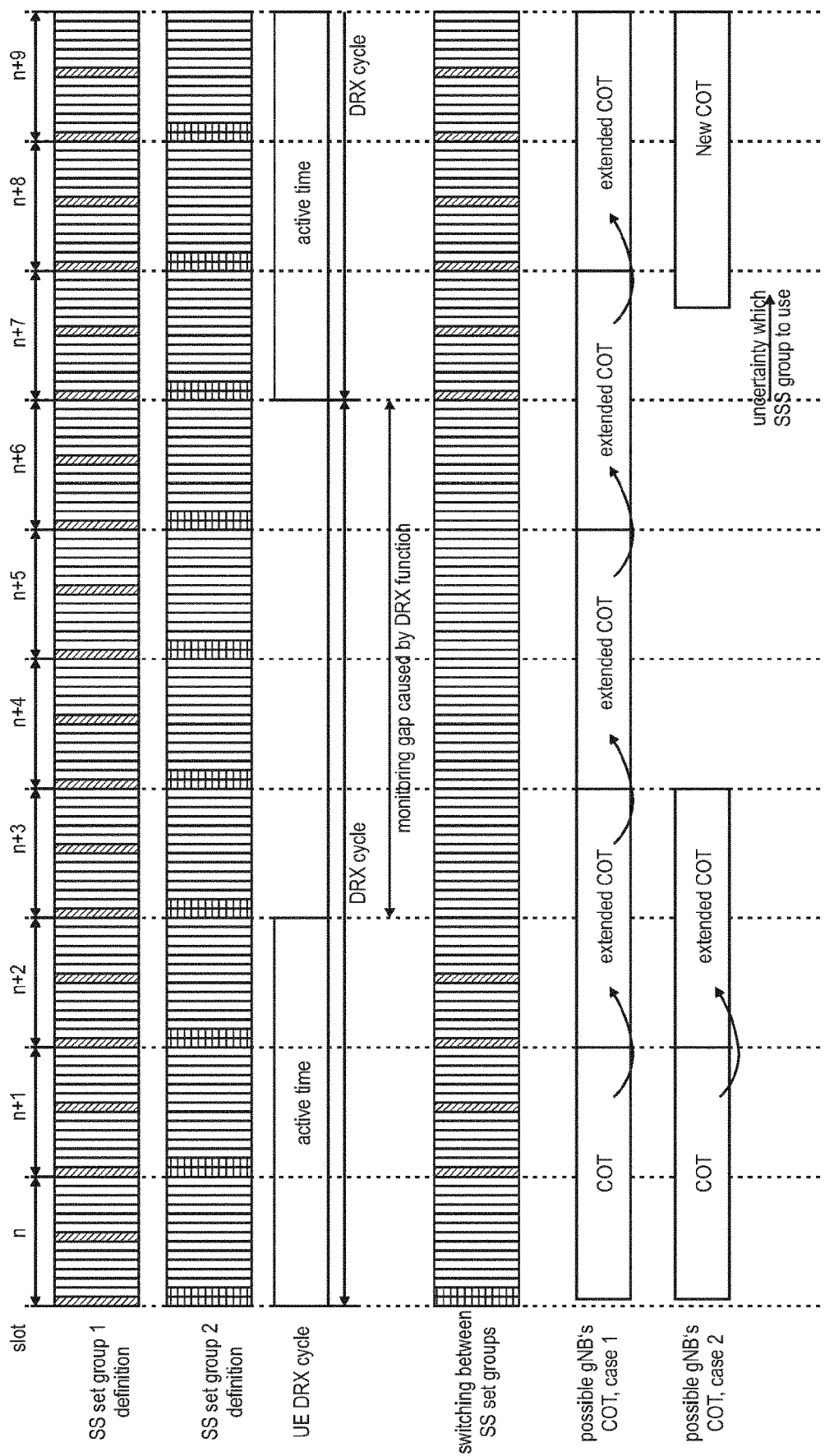
FIG. 12 illustrates another exemplary implementation of the SSS group switching operation for a UE, of the parallel operation of the DRX function as well as the resulting problem.

As a possible solution, the implementation of FIG. 12 simply assumes that the UE continues using the SSS group that was used by the UE right before entering the non-monitoring time gap. However, this may not be ideal because the previous SSS group might not be the one intended by the gNB to be used by the UE. For instance, in case the gNB no longer occupies the unlicensed channel when the UE exits the non-monitoring time period, the UE is supposed to use SSS group 2.

Correspondingly, the inventors have identified the possibility for improving the search space set group switching performed by the UE, and specifically to avoid undefined UE behavior and disadvantageous UE behavior. Improving the SSS group switching procedure may facilitate overcoming one or more of the above-identified problems.

In the following, UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 13:
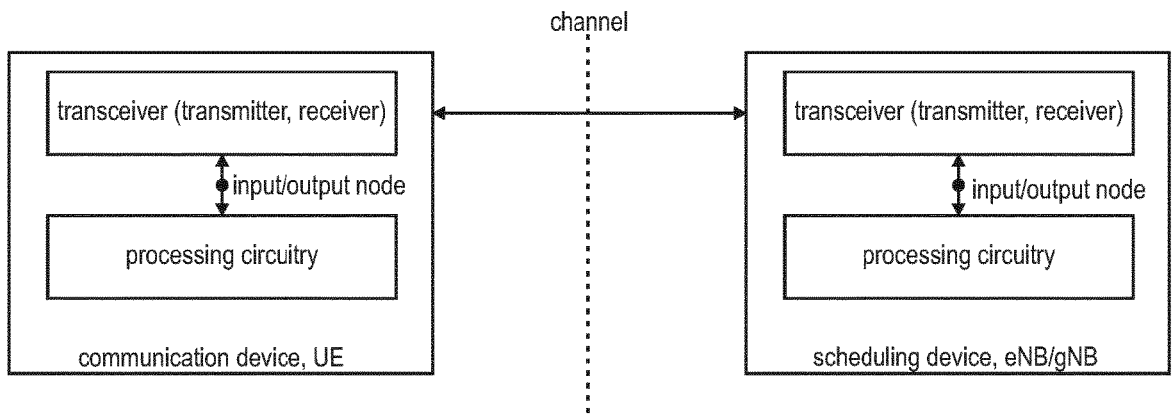
FIG. 13 illustrates the exemplary and simplified structure of a UE and a gNB.

FIG. 13 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

An improved SSS group switching procedure for monitoring the PDCCH will be described in the following.

Figure 14:
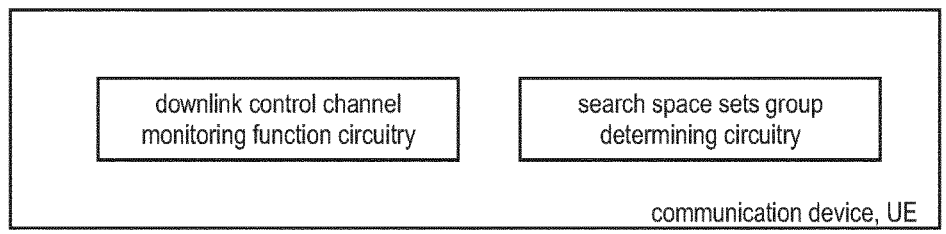
FIG. 14 illustrates a structure of the UE according to an exemplary implementation of an improved SSS group switching procedure.

FIG. 14 illustrates a simplified and exemplary UE structure according to one solution of the improved SSS group switching procedure, and can be implemented based on the general UE structure explained in connection with FIG. 13. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 14, the UE may include downlink control channel monitoring function circuitry and search space sets group determining circuitry.

In the present case as will become apparent from the below disclosure, the processing circuitry can thus be exemplarily configured to at least partly perform one or more of operating a monitoring function that involves monitoring a downlink control channel, of determining one group of the plurality of search space sets groups, of performing a DRX function, etc.

The receiver can thus be exemplarily configured to at least partly perform one or more of receiving an indication of the one group of search space sets, detecting a signal in the downlink, receiving information on a channel occupation status of an unlicensed spectrum of a radio cell by from the base station, etc.

The transmitter can thus be exemplarily configured to at least partly perform one or more of performing an uplink transmission, etc.

One solution as will be disclosed in more detail further below is implemented by a UE that includes the following. A processor of the UE operates a monitoring function that involves monitoring of a downlink control channel of an unlicensed radio cell based on one of a plurality of groups of search space sets. The unlicensed radio cell operates in an unlicensed spectrum and is controlled by a base station that is in communication with the user equipment. Further, one of the plurality of groups of search space sets is configured to be a default group of search space sets. The processor determines one group of the plurality of search space sets groups for performing the monitoring function, depending on the downlink control channel. The monitoring function is not performed during a non-monitoring time period. The processor determines to perform the monitoring function based on the default group of search space sets, when performing the monitoring function subsequent to the non-monitoring time period.

Figure 15:
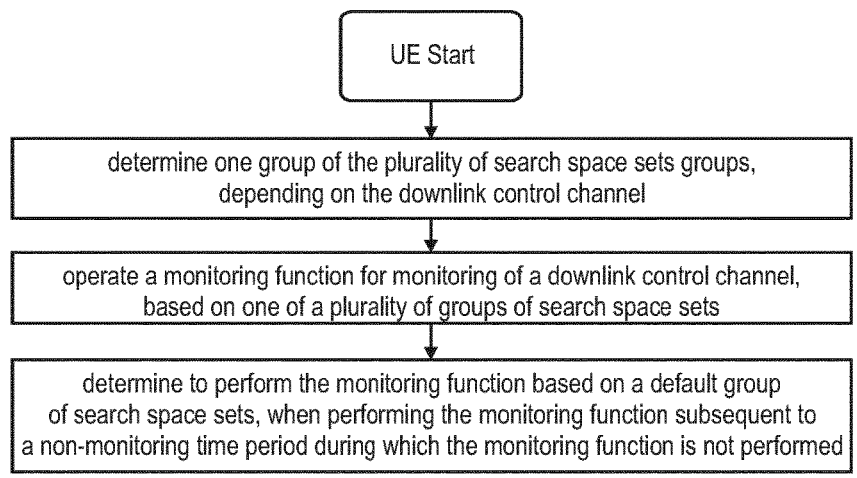
FIG. 15 is a flow diagram for the UE behavior, according to an exemplary implementation of an improved SSS group switching procedure.

A corresponding sequence diagram for an exemplary UE behavior in line with the above-discussed UE is illustrated in FIG. 15. As apparent therefrom, for operating the monitoring function the UE has to first determine the corresponding group of SSS, depending on the downlink control channel (e.g., explicit information obtainable from the downlink control channel, or implicitly derivable from the downlink control channel). Then, the UE operates the monitoring function based on the determined SSS group. The last step of the sequence diagram reflects the special case of the present solution according to which the UE determines to use the default SSS group for performing the monitoring function, namely when the monitoring function is to be performed subsequent to a non-monitoring time period during which the monitoring function was not performed.

Correspondingly, a UE is provided that performs an exemplary improved switching procedure for switching between groups of search space sets usable when monitoring the downlink control channel.

The disadvantages identified for prior art solutions are solved, because the UE behavior is defined in case that the UE does not know which SSS group to use due to a non-monitoring time period. The advantage is obtainable independent from how the SSS group switching is controlled at the UE, be it by explicit instruction from the gNB or by implicit indication (e.g., following the COT status of the gNB).

For instance, first assuming that the SSS group switching relies on explicit instructions from the gNB, the UE, during a non-monitoring time period that is not expected by the gNB (e.g., the explicit instruction is carried by GC-PDCCH targeting a group of UEs, but some UE is in a non-monitoring period due to a radio measurement or due to an uplink transmission by the UE or due to a sidelink transmission by the UE), is not able to determine whether or not an explicit instruction to switch to a SSS group is transmitted by the gNB.

Moreover, assuming that the SSS group switching follows the COT status of the gNB for the unlicensed radio cell, the UE, during a non-monitoring time period, may not be able to derive the COT status that will be at the time when exiting the non-monitoring time period. Therefore, when the UE determines that the COT status at a point in time when the UE exits the non-monitoring time period and needs to restart performing the monitoring function is unknown, the UE may resort to the default SSS group. On the other hand, when the UE determines that the COT status at a point in time when the UE exits the non-monitoring time period and needs to restart performing the monitoring function is known, the UE may determine the corresponding SSS group in the usual manner (here, e.g., based on the COT status).

In any case, the UE, during the non-monitoring time period, was not able to obtain information on which SSS group to use when exiting the non-monitoring time period and entering the subsequent monitoring time period. By using a default SSS group, when returning to the monitoring time period, subsequent to the non-monitoring time period, the UE is able to determine the default SSS group to perform the monitoring function. The default SSS group is thus used irrespective of the latest SSS group used by the UE and irrespective of the SSS group that the UE would use in the hypothetical case that the non-monitoring time period had not occurred.

The above solutions may for example provide for the following exception to the above. Even when the UE determines that the COT status at a point in time when the UE exits the non-monitoring time period and needs to restart performing the monitoring function is known, the UE may still resort to the default SSS group, namely when the subsequent monitoring time period is caused by an uplink transmission to be performed by the UE.

According to the above-discussed solution, the UE thus restarts performing the monitoring function based on the default SSS group, when exiting the non-monitoring time period. Then, the UE may eventually switch away from the default SSS group for the monitoring function, e.g., when receiving a new switching instruction from the base station or when the UE is again able to implicitly determine the correct SSS group (e.g., depending on whether the UE is in a channel occupancy time period of the gNB or not).

The non-monitoring time periods mentioned in the above solution can be caused by different parallel operations of the UE, such as a DRX function that alternates sleep periods (non-monitoring time periods) with active time periods, or a radio measurement function, or a transmission function.

In case that UE is operating with DRX function, and SSS grouping switching indication is transmitted via UE-specific PDCCH, gNB may not transmit such switching indication during the non-Active Time because gNB is aware of UE's DRX cycle. Therefore, in most of the cases, which group is used should be clear to the UE. Nevertheless, there is still some chance that UE-specific PDCCH carrying the switching indication is not correctly decoded by the UE. If this happens, there would be different understanding between UE and gNB regarding the SSS group in use. In order to recover from such error case, at the beginning of each DRX cycle, a default SSS group can be used by both UE and gNB. By such mechanism, any potential misalignment will be confined within one DRX cycle in the worst case.

The default SSS group introduced by the above-discussed solution can be either configured by the base station or can be hard-coded in the UE (e.g., in a chip). The default SSS group may comprise different search space sets. In one exemplary implementation, the default SSS group has a fine monitoring granularity, thereby providing distributed monitoring occasions for the UE during each slot to be reached early (see, e.g., SSS group in slot n of FIG. 10, or SSS group 1 of FIG. 11).

Figure 16:
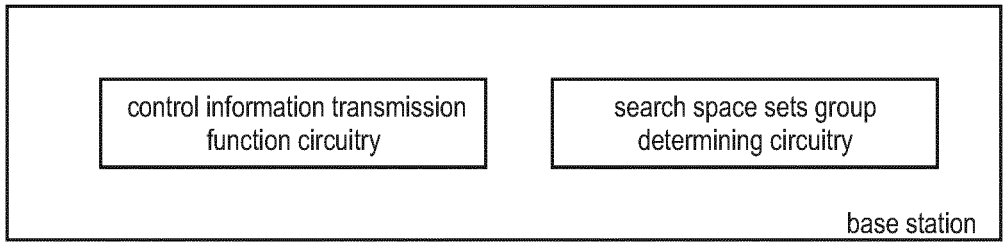
FIG. 16 illustrates a structure of the base station according to an exemplary implementation of an improved SSS group switching procedure.
Figure 17:
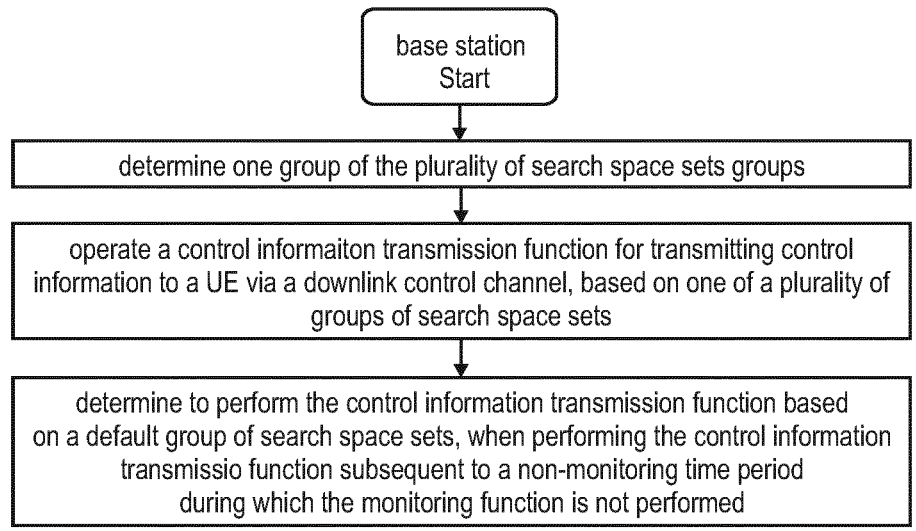
FIG. 17 is a flow diagram for the base station behavior, according to an exemplary implementation of an improved SSS group switching procedure.

The base station is also involved in the improved SSS group switching procedure explained above. Correspondingly, the solution also provides an improved base station as follows. FIG. 16 illustrates a simplified and exemplary base station structure according to one solution of the improved SSS group switching procedure, and can be implemented based on the general base station structure explained in connection with FIG. 13. FIG. 17 illustrates a corresponding sequence diagram for an exemplary base station behavior in line with the above-discussed base station.

Such a base station comprises the following. A processor of the base station performs a control information transmission function that involves transmitting to a user equipment, UE, control information via a downlink control channel of an unlicensed radio cell based on one of a plurality of groups of search space sets. The base station controls the unlicensed radio cell that operates in an unlicensed spectrum. One of the plurality of groups of search space sets is configured to be a default group of search space sets. The processor determines one group of the plurality of search space sets groups for performing the control information transmission function. The control information transmission function is not performed during a non-monitoring time period of the UE. The UE does not perform a monitoring function that involves monitoring the downlink control channel during such a non-monitoring time period. The processor determines to perform the control information transmission function based on the default group of search space sets, when performing the control information transmission function subsequent to the non-monitoring time period.

Thus, such a base station operates in synchronization with the improved UE, with regard to transmitting the control information via the downlink control channel, when the UE actually performs the monitoring function. To said end, the base station may determine which SSS group to use in a corresponding manner as the UE. For instance, both the UE and the base station can implicitly derive the SSS group to use from the COT status of the gNB. This can involve the same evaluation based on the possible knowledge of the UE about the COT status of the gNB when exiting the non-monitoring time period as explained in detail above and below in connection with the UE.

In another example, the base station may autonomously determine which SSS group to use (e.g., among SSS groups with which the UE is configured) and then may provide an explicit indication of the determined SSS group to the UE using the control information transmission function via the downlink control channel.

Moreover, to allow for the synchronization, the base station determines the non-monitoring time periods of the UE, e.g., those time periods during which the UE does not perform a corresponding monitoring function of the downlink control channel. In one exemplary implementation, the base station is aware of the DRX function operated by the UE, and thus the alternating sleep periods and active time periods defined by the DRX function. Moreover, the base station is typically also aware of the time periods during which the UE performs an uplink transmission or sidelink transmission, thus aware of the non-monitoring time periods caused by these UE transmissions. Finally, also some or all of the radio measurements gaps the UE uses for performing radio measurements are known to the gNB, because the gNB configures same.

In one exemplary implementation of the base station, the default SSS group can be determined by the base station. Then, the base station can inform the UE about the default SSS group such that the UE has the required configuration for performing the monitoring function based on the various SSS groups.

Figure 18:
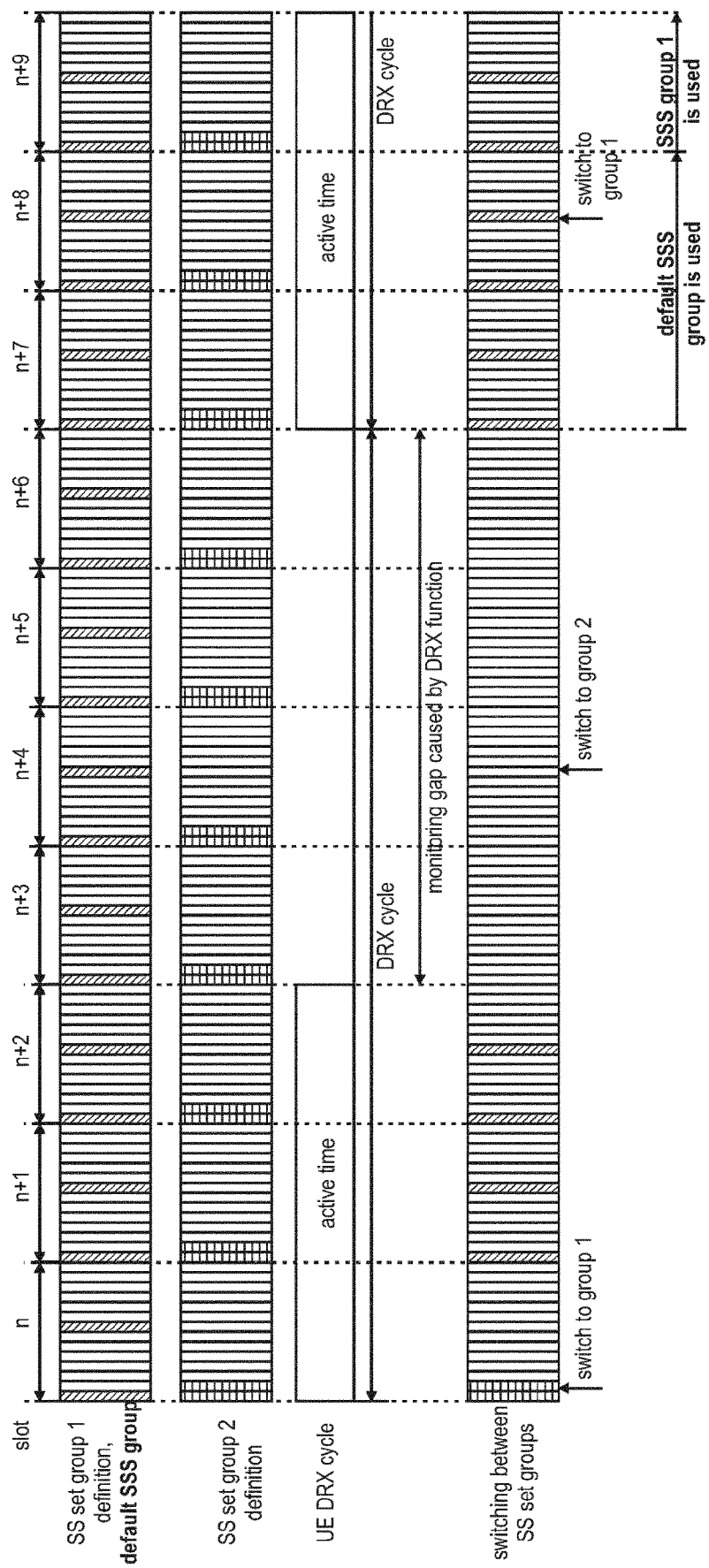
FIG. 18 illustrates how the improved SSS group switching procedure is applied in parallel to the operation of a DRX function, where the switching is explicitly controlled by the gNB and UE.

FIG. 18 illustrates one exemplary implementation of the switching of the SSS groups in accordance with the above solution of FIG. 14-17. The assumptions made for FIG. 18 are quite similar to those made in connection with FIG. 11. In addition, SSS group 1 is defined as being the default SSS group. As apparent from FIG. 18, the UE when exiting the non-monitoring time period and restarting the monitoring function of the downlink control channel in slot n+7, determines to use the default SSS group (here SSS group 1) for the monitoring function, irrespective of missed switching instructions from the base station and irrespective of the previously-used SSS group (although in this particular example of FIG. 18, the default SSS group and previously-used SSS group are the same).

The default SSS group will be at least used for performing the monitoring function until the UE is instructed to switch to another particular SSS group. Here, the UE will continue using the default SSS group in slots n+7 and n+8, when exemplarily assuming that the UE is able to receive the switching instruction in slot n+8. As of the next slot n+9, the UE may then perform a determination of the corresponding SSS group 1 to be used in subsequent slots n+9, etc. In the exemplary scenario of FIG. 18, it is assumed that the UE continues to use SSS group 1 for the monitoring function, not because it is the default SSS group but because the UE is following the explicit switching instruction from the gNB.

Figure 19:
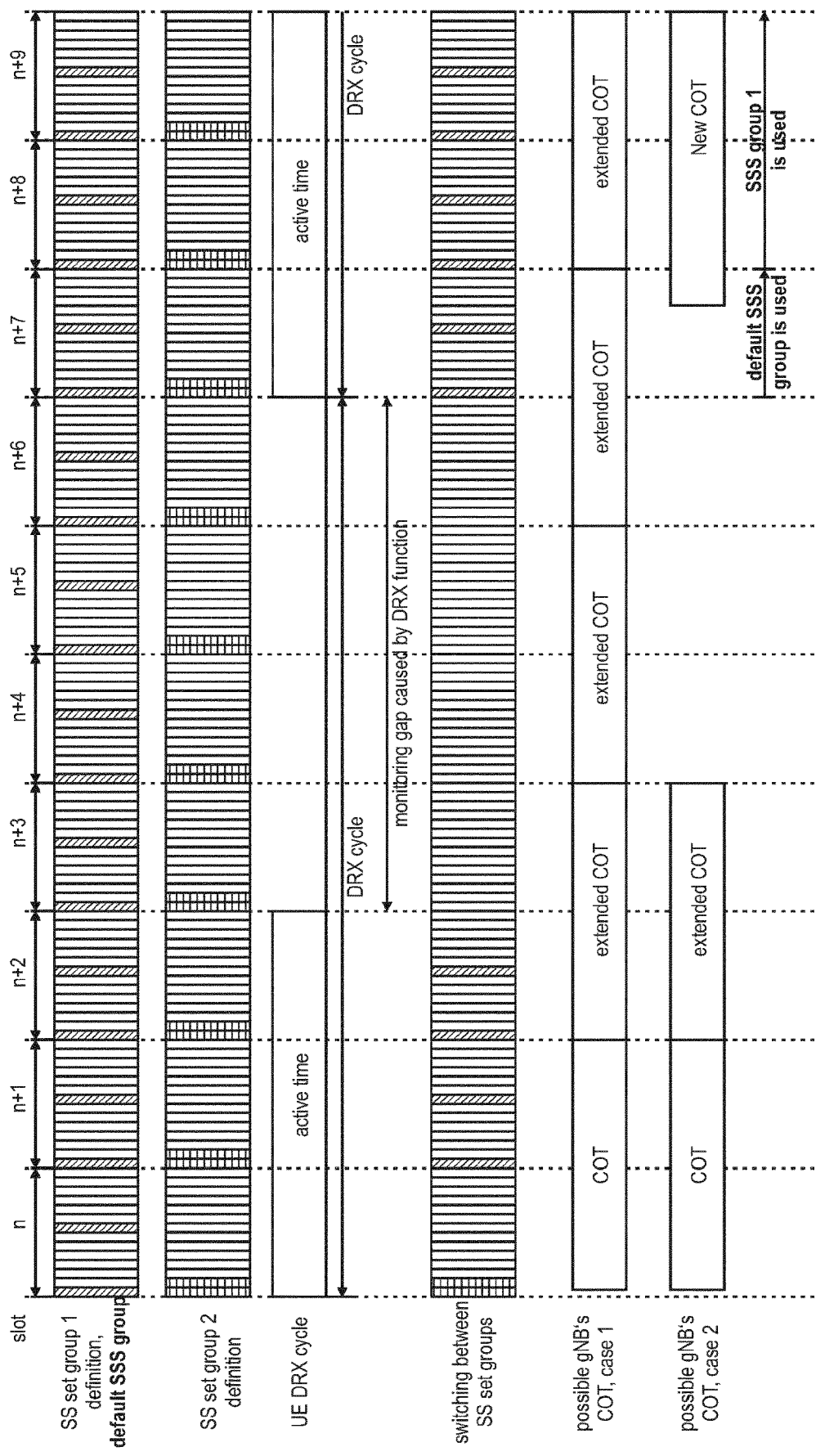
FIG. 19 illustrates how the improved SSS group switching procedure is applied in parallel to the operation of a DRX function, where the switching is implicitly controlled by the gNB and UE, particularly following the COT structure.

FIG. 19 illustrates another exemplary implementation of the switching of the SSS groups in accordance with the above solution of FIG. 14-17. The assumptions made for FIG. 18 are quite similar to those made in connection with FIG. 12. In addition, SSS group 1 is defined as being the default SSS group. As apparent from FIG. 19, the UE when exiting the non-monitoring time period and restarting the monitoring function of the downlink control channel in slot n+7, determines to use the default SSS group 1 for the monitoring function, irrespective of the COT status of the base station and irrespective of the previously-used SSS group (although in this particular example of FIG. 19, the default SSS group and previously-used SSS group are the same).

This applies to both illustrated COT status cases, i.e., where the COT status extends over the monitoring gap (case 1), and where the COT ends during the monitoring gap.

The default SSS group will be at least used for the performing the monitoring function in slot n+7. When exemplarily assuming that the UE is able to derive the actual COT status of the gNB during the active time of slot n+7, the UE may then perform a determination of the corresponding SSS group to be used in subsequent slots n+8, n+9, etc. In the exemplary scenario of FIG. 19, it is exemplarily assumed that the UE continues to use SSS group 1 for the monitoring function, not because it is the default SSS group but because the UE is able to determine that the gNB has acquired the unlicensed channel for slots n+8 and n+9.

The above solution as well as variants and further improvements on the above solution will be explained in more detail below. For the following explanations of the solutions for the improved SSS group switching procedure and downlink control channel monitoring procedure, some basic assumptions are exemplarily made herein. Some of these assumptions will be based on an exemplary 3GPP 5G NR standard-compliant implementation. While in the following some of explanations are given primarily with respect to the 5G NR communications systems, the solutions are also applicable to LTE or LTE-A communication systems.

For instance, it is exemplarily assumed that the UE is already configured with all required information to be able perform the downlink control channel (PDCCH) monitoring function. This may also involve configuration regarding different search space sets and groups of search space sets. In the following, for ease of explanation, it is exemplarily assumed that only two different groups of search space sets are configured at the UE.

In one exemplarily implementation, configuration of the search space sets could be done based on mechanisms already defined in the 5G NR standards (see above discussion), such as using RRC configuration/reconfiguration messages. Moreover, the configuration of different groups of SSS can also exemplarily rely on already existing mechanisms of the 5G NR standards, such as the RRC configuration/reconfiguration messages. One example of such configuration could be that each search space set is associated with a group ID. As a result, the search space sets with the same group ID belong to the same group. In such an exemplary implementation, the gNB has full control of which search space sets will be included in which of the two groups, e.g., controlling how many PDCCH monitoring occasions the UE has per slot, at which OFDM symbols the PDCCH monitoring opportunities occur per slot, etc. For instance, the two groups could be defined to comprise search space sets as illustrated in FIG. 10 or 11.

In wideband operation where one carrier includes multiple LBT bandwidths, there could be a need for configuring more than two groups. For example, considering inside the COT, multiple search space set groups are configured to cover different combinations of LBT bandwidths that have passed LBT. Then, depending on the actual LBT outcome, one of the groups can be activated for PDCCH monitoring within the COT.

According to one exemplary implementation, the gNB may also decide on a default SSS group, which may be, e.g., either of the two SSS groups. For instance, SSS group 1 (see FIG. 10 or FIG. 11) could be defined as the default SSS group, SSS group 1 providing distributed monitoring occasion within each slot rather than providing concentrated monitoring occasions at the beginning of each slot (such as SSS group 2 of FIGS. 10 and 11). By defining SSS group 1 as the default SSS group, it is facilitated that the delay to reach the UE right after the non-monitoring time period is reduced.

On the other hand, SSS group 2 could also be defined as the default SSS group by the gNB, e.g., when gNB is operating as Fixed Frame Based Equipment when the gNB attempts to acquire the channel only at the beginning of a slot. In such case, there is no need for UE to monitor PDCCH elsewhere in a slot before identifying the COT. Another scenario where configuring SSS group 2 as the default would be useful for some UEs is that those UEs are sensitive to power consumption. In such case, using a coarser granularity for PDCCH monitoring before identifying the COT can save the UE's power.

While it is assumed above that there is only one default SSS group, specific exemplary implementations of the above improved SSS group switching procedure provide more than one default SSS group. For instance, in a dual connectivity scenario, where the UE is connected simultaneously to different base stations, different default SSS groups can be defined per base station.

In one example of configuration of the default group, a RRC signaling can indicate a particular group ID as the default group. On the other hand, the default SSS group ID could also be fixed by a 3GPP 5G NR specification, such that no RRC signaling for the default group ID is needed, e.g., the default SSS group would be hardcoded into a chip or memory of the UE. Nevertheless, the gNB may still in the full control to include which search space set(s) to which group. For example, the 3GPP specification could define the SSS group with ID #0 as the default group (assuming that the SSS groups are sequentially numbered starting from 0), but which search space set(s) are included in group #0 is still up to gNB by configuration. In one exemplary 5G NR implementation, dual connectivity is implemented as follows. The UE is connected using two cell groups via a master base station and a secondary base station. A master cell group (MCG) is a group of serving cells associated with the master base station, comprising a primary cell (PCell) and optionally one or more secondary cells (SCell). Furthermore, a secondary cell group (SCG) is a group of serving cells associated with the secondary base station, comprising a PCell and optionally one or more SCells. According to current 5G NR implementations, the DRX function is configured and performed per cell group (e.g., per MAC entity). In such a scenario, different default SSS groups can be defined per cell group, e.g., one default SSS group for the master cell group and another SSS group for the secondary cell group.

It is further exemplarily assumed that the UE is able to perform the PDCCH monitoring function based on the configured search space sets, particularly based on all the configured search space sets associated to that SSS group that is currently active.

Moreover, it is exemplarily assumed that the UE performs other functions in parallel to the PDCCH monitoring function, such as one or more of the DRX function, the radio measurements functions, and uplink transmission function. Each of these functions may cause non-monitoring time periods during which the UE does not perform the PDCCH monitoring function. It is also exemplarily assumed that the UE is configured by the gNB accordingly to be able to perform each of these functions, e.g., based on mechanisms already defined in the 5G NR standards (see above discussion).

In particular, the DRX function defines different DRX cycles (short and long) respectively with sleep time periods and active time periods. As discussed above in detail, the Active Time is defined specifically in the 3GPP 5G NR standards (see above), and the sleep periods are those periods of time during which the UE is not in Active time. The sleep periods can be considered the non-monitoring time periods, during which the PDCCH monitoring function is not performed by the UE.

For example, a non-monitoring time period (also termed monitoring gap) can be caused by two different DRX cycles, e.g., when the UE goes to sleep after the end of active time within a DRX cycle, and then wakes up at the beginning of the next DRX cycle (see, e.g., FIG. 11) (see also Active Time definition, and, e.g., timers drx-onDurationTimer, drx-InactivityTimer).

On the other hand, a monitoring gap can also occur between non-consecutive active time periods within one single DRX cycle. For instance, the UE goes to sleep after one active time, but then additionally wakes up for PDCCH monitoring in another active time, wherein this other active time could be related to other reasons, such as the UE waiting for an UL or DL retransmission (see also Active Time definition, and, e.g., timers drx-RetransmissionTimerDL and drx-RetransmissionTimerUL) or the UE waiting for contention resolution of a random access procedure (see also Active Time definition, and, e.g., timer ra-ContentionResolutionTimer), or the UE waits for a scheduling message after sending a scheduling request, or the UE waits for a scheduling message indicating a new transmission after reception of a random access response message of a contention-free random access procedure.

Figure 7:
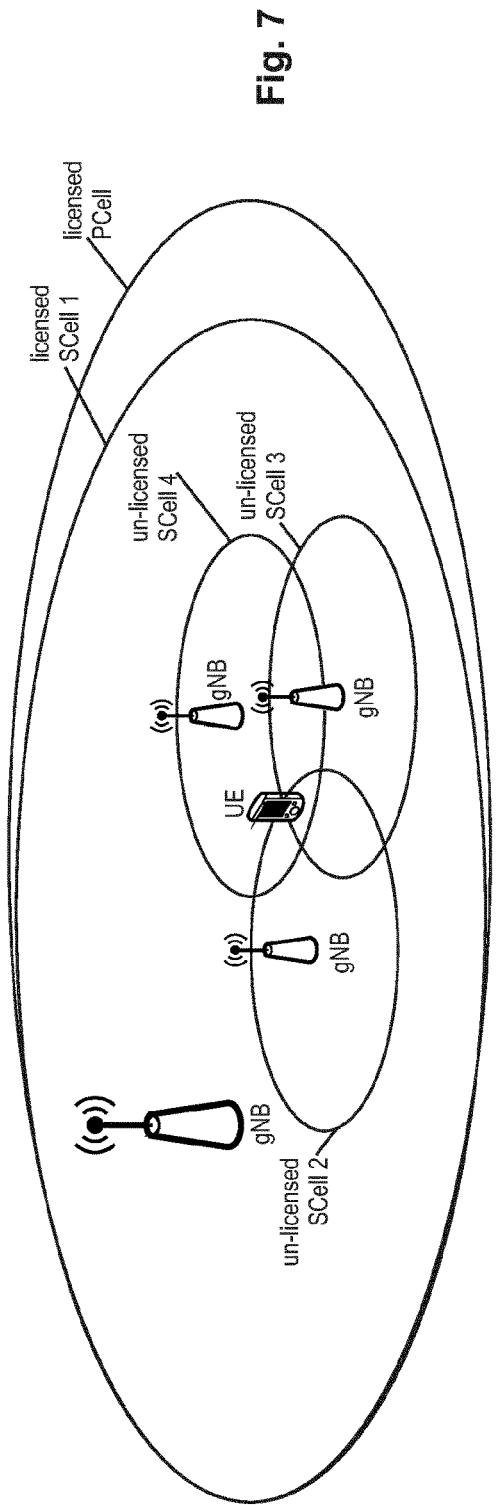
FIG. 7 illustrates an exemplary LAA scenario with several licensed und unlicensed cells.

It is assumed that the UE is located in an unlicensed radio cell, such as in a scenario discussed in connection with FIG. 7. The UE is performing the PDCCH monitoring function according to the currently active SSS group.

For the following explanation of the principles underlying the disclosure, it is exemplarily assumed that the SSS group switching relies on an implicit indication, according to which the UE derives the SSS group to be used depending on the current channel occupancy status of the unlicensed radio cell by the gNB. For instance, one of the two SSS groups (here, e.g., SSS group 1) is thus associated with a negative gNB COT status (unlicensed channel not occupied by gNB), and the other of the two SSS groups (here, e.g., SSS group 2) is associated with a positive gNB COT status (unlicensed channel is occupied by gNB).

Figure 20:
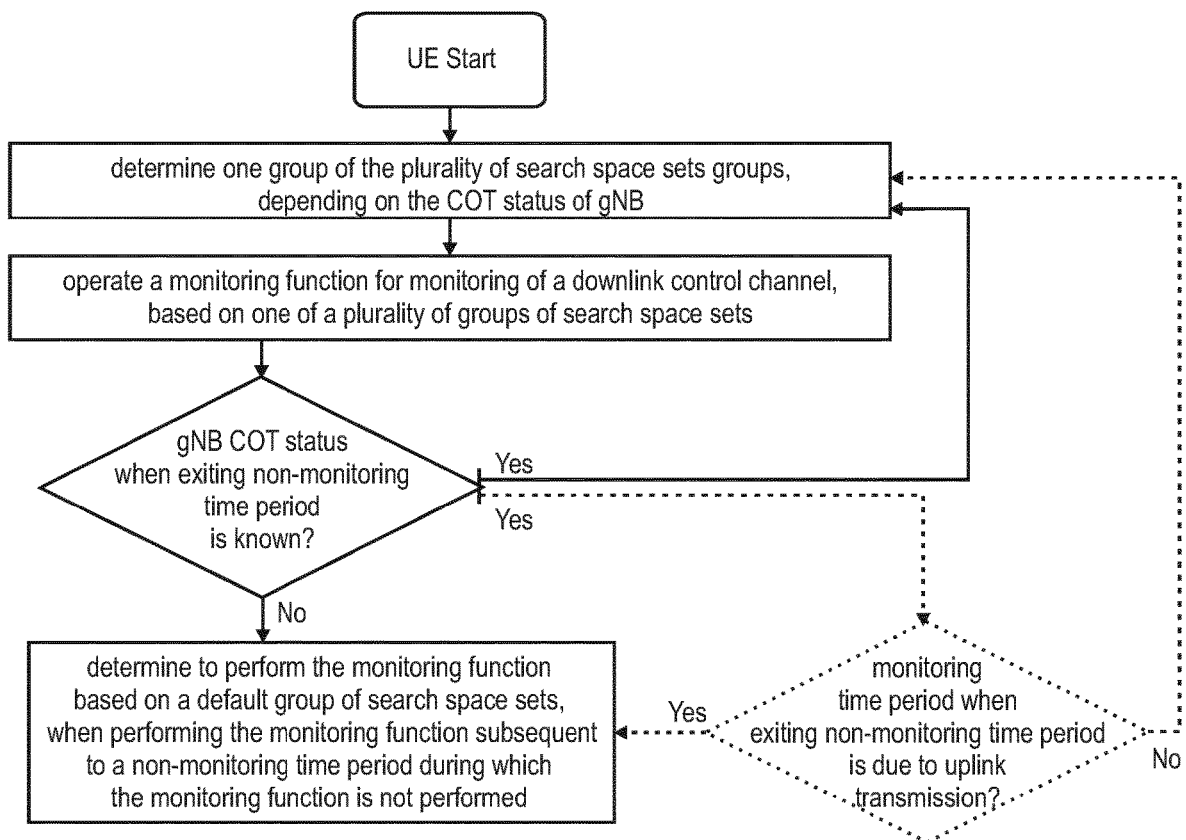
FIG. 20 is a flow diagram for the UE behavior, according to another exemplary implementation of an improved SSS group switching procedure.

FIG. 20 illustrates the UE behavior according to such an exemplary solution. As apparent therefrom, the UE determines whether or not it knows the gNB COT status that will be at the time when exiting the non-monitoring time period and entering the monitoring time period. In case the UE does not know, the UE may determine to use the default SSS group for the monitoring function. On the other hand, in case the UE does know the COT status, the UE may proceed to determine the SSS group that corresponds to this known COT status and may operate the PDCCH monitoring function based on that determined SSS group when exiting the non-monitoring time period.

Figure 21:
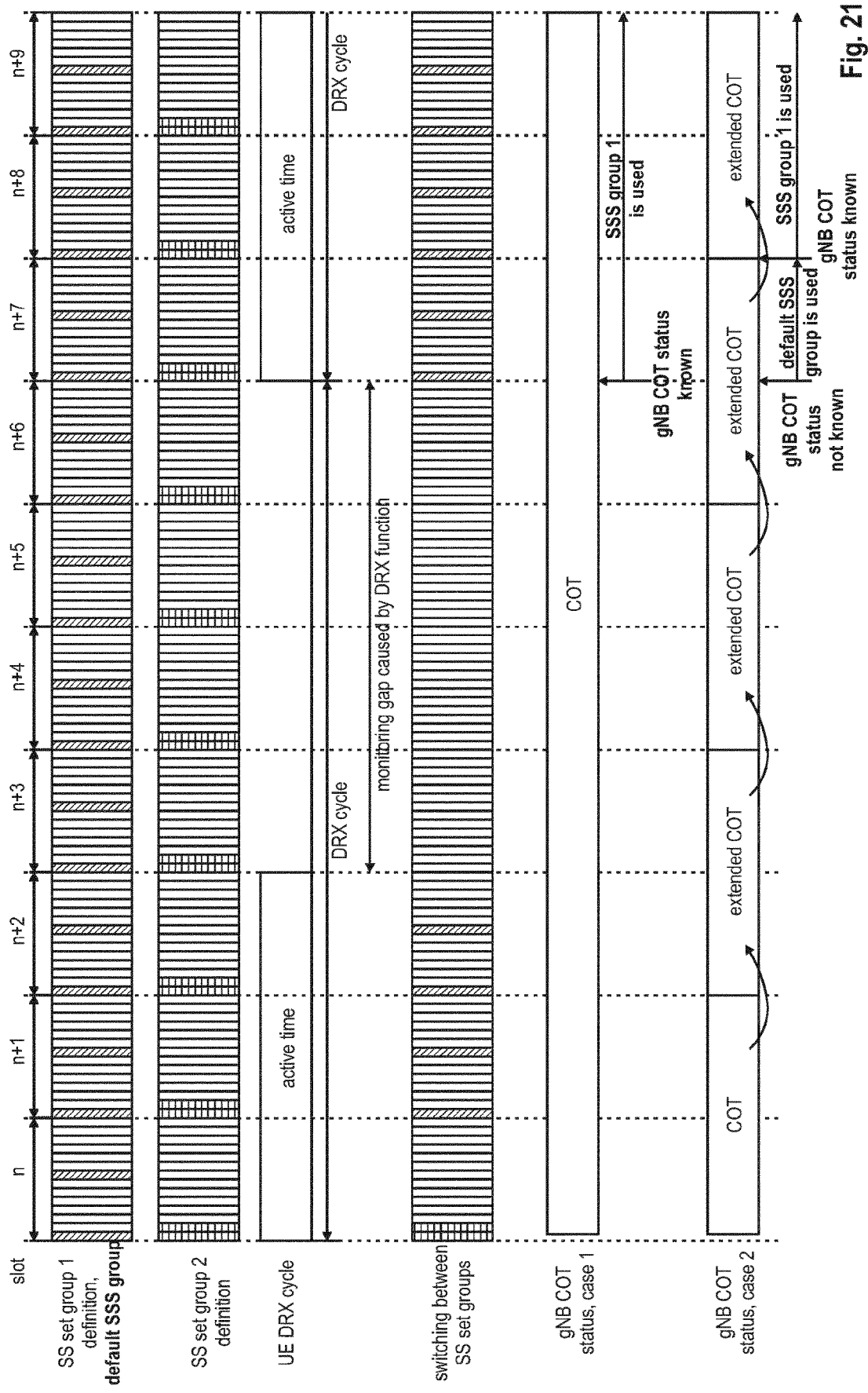
FIGS. 21 and 22 illustrate how the improved SSS group switching is applied in parallel to the operation of a DRX function, where the UE's knowledge of the COT structure when exiting the non-monitoring time period influences which SSS group is used.

This sequence of events is illustrated in FIG. 21, which shows at the bottom two different case scenarios of gNB channel occupancy, and how the corresponding improved SSS group switching works for each case.

For case 1, it is assumed that information provided by the gNB for the COT allows the UE to determine the COT status at the beginning of slot n+7, i.e., when exiting the non-monitoring time period. For instance, the gNB could have provided the UE with the COT duration already in slot n+1. Accordingly, knowing the COT status, the UE would then determine the SSS group associated with the known COT status, and then perform the monitoring function during the Active Time of slots n+7, n+8 . . . using the search space sets of that SSS group.

For case 2, it is assumed that the gNB dynamically determines the COT duration and thereby repeatedly extends the channel occupancy needed. Thus, the gNB repeatedly informs the UE about the COT status in the current and next slot(s) only. For instance, a GC-PDCCH indicates the COT structure for the current slot and the next slot only. In such a scenario, when the gNB decides to end COT at the next slot, it may provide via the GC-PDCCH of the current slot a corresponding "end of COT" indication. Thus, when the UE enters the non-monitoring time period as of slot n+3, it cannot know whether or not the COT is further extended by the gNB or not. Thus, the gNB COT status at the beginning of slot n+7 is not known to the UE. As a result, the UE would then revert to the default SSS group and perform the monitoring function during the Active time of slot n+7 based on the search space sets of the default SSS group. It is then exemplarily assumed that the UE is able to determine the COT status during slot n+7, such that the UE determines the SSS group in the usual manner based on the COT status and uses that SSS group for operating the monitoring function in slots n+8 and n+9 (here, e.g., also SSS group 1).

According to an optional implementation, FIG. 20 illustrates in dashed lines an alternate sequence according to which even if the gNB COT status when exiting the non-monitoring time period is known ("yes" in FIG. 20), the UE may still determine to reset to the default SSS group, namely in case the subsequent monitoring time period (when exiting the non-monitoring time period) is due to an uplink transmission that is to be performed by the UE. For instance, this uplink transmission can be scheduled by the gNB after the UE transmits a scheduling request to the gNB (see, e.g., Active Time definition: "a Scheduling Request is sent on PUCCH and is pending . . . ") or can be scheduled by the gNB as part of the random access procedure (see, e.g., active Time definition: "a PDCCH indicating a new transmission . . . is not been received after successful reception of a Random Access Response . . . ").

Figure 22:
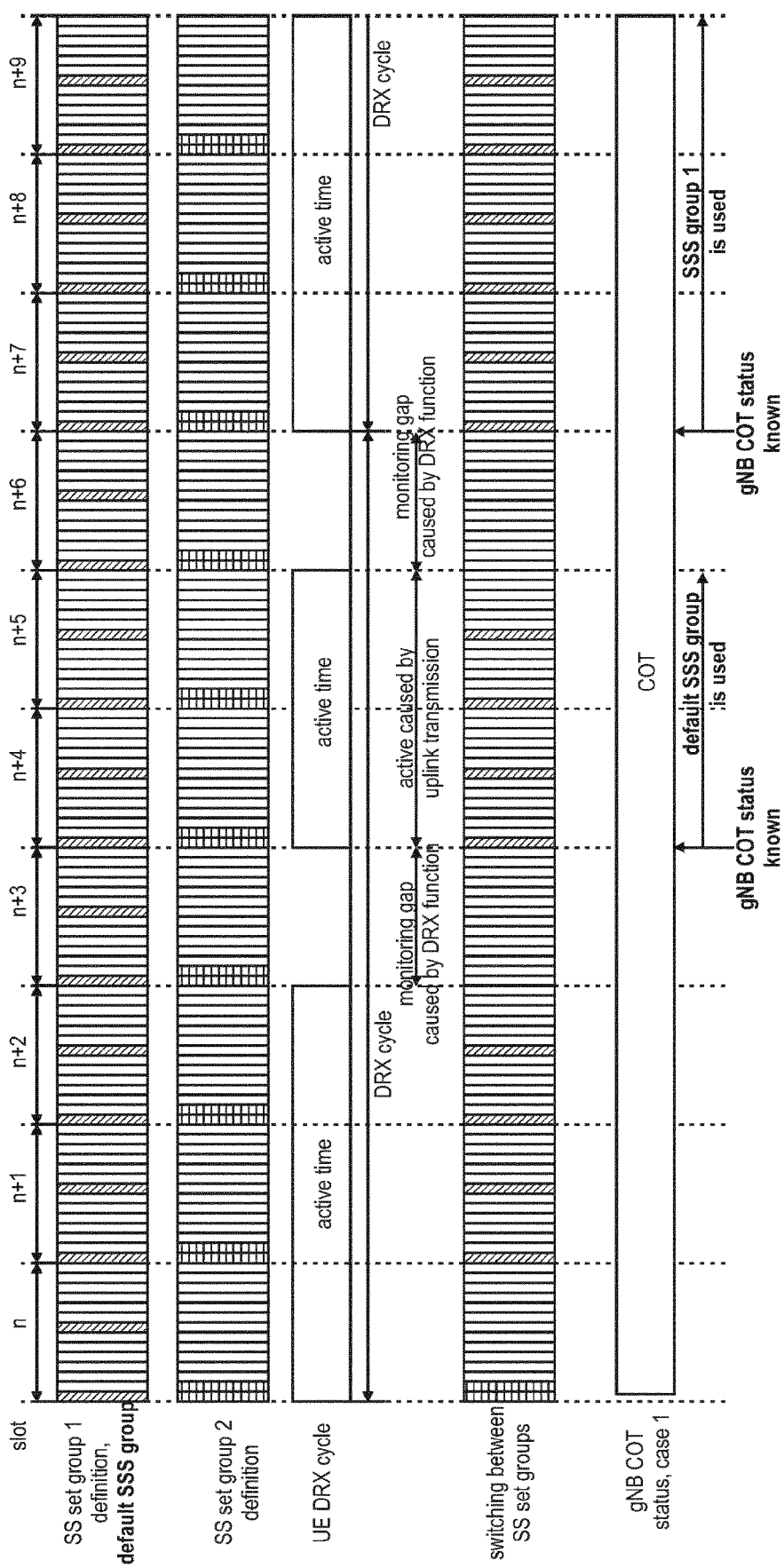

Such a case is illustrated in FIG. 22, where the monitoring gap occurs between two active times within one DRX cycle, where the additional active time is due to an uplink transmission that the UE has to perform as discussed above. As apparent from FIG. 22, when exiting the non-monitoring time periods at slots n+4 and n+7, the UE knows in both cases the COT status (here exemplarily assuming that the gNB informed the UE about the COT duration in slot n). However, in slots n+4 and n+5 of the active time caused in relation to the uplink transmission to be performed by the UE, the UE decides to use the default SSS group for performing the PDCCH monitoring function, in line with the optional implementation of the solution according to FIG. 20. On the other hand, in slots n+7, n+8, . . . , the UE determines the SSS group depending on the known COT status (here the using SSS group 1.

The reason to switch to the default SSS group in slots of an active time relating to an uplink transmission is that the default SSS group provides a finer monitoring granularity and thus the UE can be reached earlier for scheduling the uplink transmission.

Another improvement in connection with the new SSS group switching concept being discussed in 3GPP will be presented in the following. This second solution also revolves around the idea to improve the monitoring of the downlink control channel in connection with the SSS group switching.

This second solution is independent from the above-presented improved SSS group switching procedure that introduces a default SSS group. Thus, the second solution can be operated as standalone, or in combination with any of the above discussed improved SSS group switching procedures and variants.

In more detail, a UE is configured with different search space sets that it shall monitor to obtain downlink control information from the base station. The search space sets can be UE specific (e.g., specific to only one UE in the radio cell) or common (e.g., common to all or a group of UEs in the radio cell).

Search space sets are configured that are used to convey particularly important system information, such as system information facilitating access to a radio cell or system information providing further scheduling information on how to obtain other system information. For instance, a common search space set might be configured for said purpose. According to the second solution such search spaces sets conveying the particularly important system information should not be affected by the SSS group switching, in that the UE monitors these SSSs irrespective of the currently-active SSS group. This can be achieved by including such important SSSs in all SSS groups. Alternatively, these SSSs can be configured in the UE outside all of the SSS groups (i.e., not being part of any of the configured SSS groups), but they will be monitored by the UE regardless of the currently active/indicated SSS group. In any case, however, the particularly important system information will thus be obtained by the UE, regardless of the SSS group that is currently being used for the monitoring function of the downlink control channel.

This solution can also be employed in the following exemplary 5G NR compliant communication systems. In current 5G NR-compliant communication systems, the above mentioned particularly important information is conveyed in the system information block 1 (SIB1) (also see TS 38.331 v15.6.0 section 6.2.2: *"SIB1 contains information relevant when evaluating if a UE is allowed to access a cell and defines the scheduling of other system information. It also contains radio resource configuration information that is common for all UEs and barring information applied to the unified access control."*). SIB1 is transmitted by the gNB in a common search space set, according to parameters configured by the Master Information Block, MIB (also see TS 38.331 v15.6.0, section 6.2.2: MIB includes the field pdcch-ConfigSIB1, which *"Determines a common Control-ResourceSet (CORESET), a common search space and necessary PDCCH parameters. If the field ssh-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.2131 [13], clause 13)."*). A common search space for SIB1 is denoted Type0 PDCCH common search space (CSS) (also see TS 38.213 v15.7.0 sections 10 and 13).

Correspondingly, the Type0 PDCCH common search space will be monitored by the UE irrespective of the currently active SSS group. For instance, the Type0 PDCCH common search space is not part of any of the SSS groups and thus monitored by the UE irrespectively.

In the following, another improvement of this solution is presented. Search space sets to be monitored by the UE are associated with frequency radio resources via corresponding control resource sets (CORESETs). A particularly important frequency resource set is CORESET with index 0, because it is associated with important system information (such as the particularly important system information mentioned above, e.g., SIB1) but possibly also other important UE-specific information and parameters carried in UE-specific search spaces. According to this improved solution, this important frequency resource set is made mandatory, in that it is to be monitored by the UE also during sleep periods, such as those provided by the DRX function operated in the UE. For instance, those search space sets that are associated with this mandatory frequency resource set (e.g., CORESET #0) are to be monitored also during DRX off periods.

In unlicensed operation, monitoring of COREST #0 and of the signal synchronization block is performed within a NR-U DRS (Discovery Reference Signal) window (the window being longer in unlicensed operation than in licensed operation).

Figure 23:
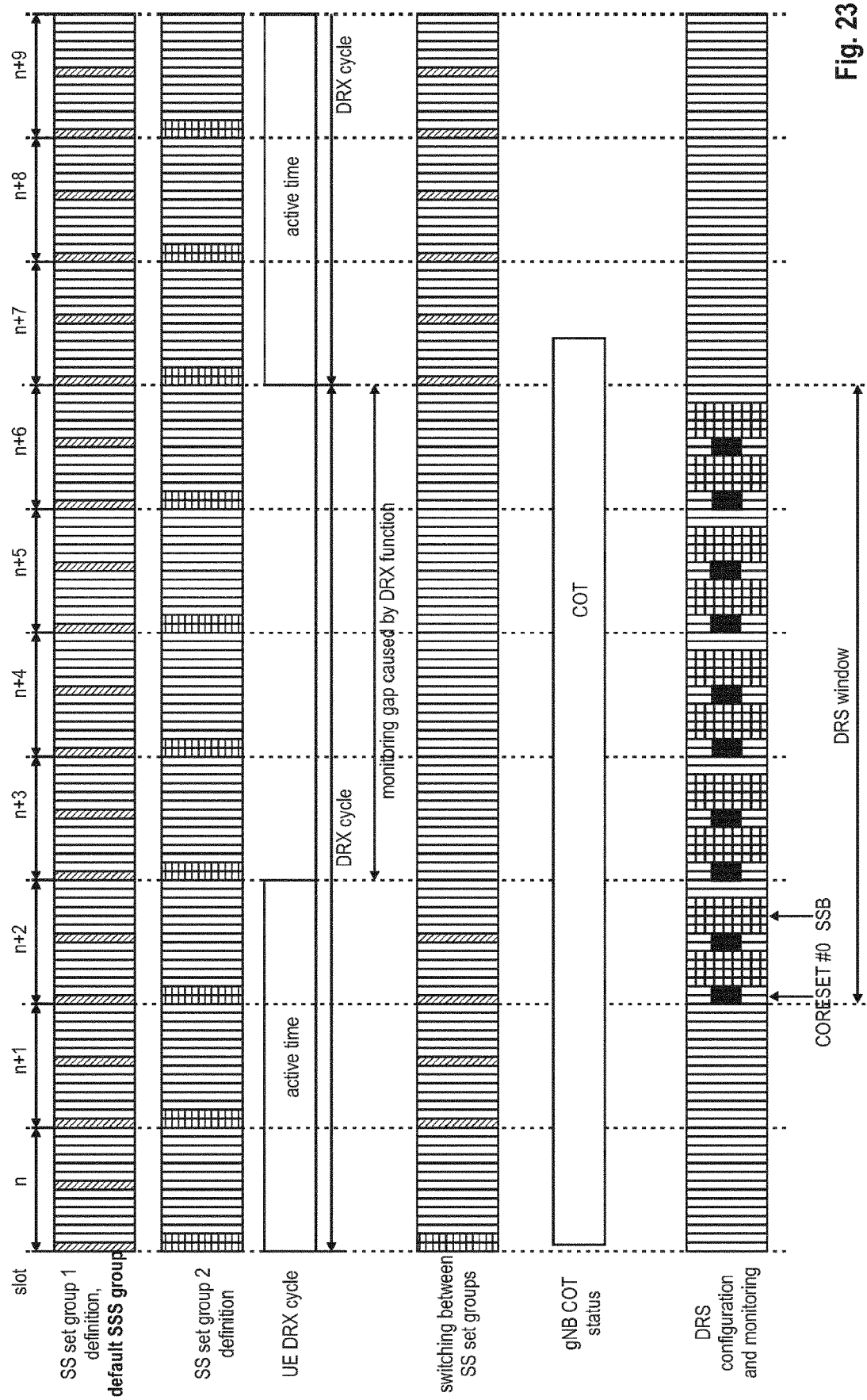
FIG. 23 illustrates another improvement to the monitoring function according to an exemplary implementation.

FIG. 23 illustrates one possible exemplary implementation of the above solution. As apparent therefrom, the monitoring of the SSB (including, e.g., the Primary Synchronization Signal, the Secondary Synchronization Signal as well as the PBCH, Physical Broadcast Channel) but also of the CORESET #0 is done by the UE in both the DRX Active Time and the DRX Off time. Therefore, the reception of important system information and the downlink synchronization are not affected by the DRX sleep function.

Further Aspects

According to a first aspect, a user equipment, UE, is provided comprising a processor that operates a monitoring function that involves monitoring of a downlink control channel of an unlicensed radio cell based on one of a plurality of groups of search space sets. The unlicensed radio cell operates in an unlicensed spectrum and is controlled by a base station that is in communication with the user equipment. Further, one of the plurality of groups of search space sets is configured to be a default group of search space sets. The processor determines one group of the plurality of search space sets groups for performing the monitoring function, depending on the downlink control channel. The monitoring function is not performed during a non-monitoring time period. The processor determines to perform the monitoring function based on the default group of search space sets, when performing the monitoring function subsequent to the non-monitoring time period.

According to a second aspect provided in addition to the first aspect, the non-monitoring time period is at least one or more of:
 a sleep time period defined by a discontinued reception, DRX, cycle of a DRX function,
 a time period during which the UE performs radio measurements, and
 a time period during which the UE performs a transmission.

According to a third aspect provided in addition to the first or second aspect, determining the one group of the plurality of search space sets groups for the monitoring function, depending on the downlink control channel, is performed by the processor based on one or more of:
 an indication of the one group of search space sets, obtainable from the downlink control channel,
 detection of one signal on the downlink control channel, optionally wherein the signal is one or more of a downlink control information message, a downlink data transmission, a downlink reference signal, and the channel occupation status of the unlicensed spectrum of the radio cell by the base station, obtainable from the downlink control channel.

According to a fourth aspect provided in addition to one of the first to third aspects, a sleep time period of a DRX function is defined when the UE is not in Active time. In an optional implementation the UE is in Active time at least during one or more of:
 a monitoring time period defined by a DRX cycle,
 a time period of inactivity, before an inactivity timer expires,
 a time period during which the UE awaits the reception of a retransmission of a data packet,
 a time period during which the UE waits so as to retransmit a data packet,
 a time period during which the UE awaits resolution of a contention of a random access procedure,
 a time period during which the UE awaits reception of a response to a scheduling request transmitted by the UE,
 a time period during which the UE awaits for a downlink control channel transmission indicating a new transmission after reception of a random access response message of a contention-free random access procedure.

According to a fifth aspect, provided in addition to one of the first to fourth aspects, the default group of search space sets is configured based on one or more of:
 a configuration message received from the base station controlling the unlicensed radio cell, optionally wherein the configuration message is a Radio Resource Control, RRC, message, or
 predetermined information of the UE.

In an optional implementation, the UE is connected to more than one base station, and one default group of search space sets is configured per base station.

According to a sixth aspect, provided in addition to one of the first to fifth aspects, the processor determines to perform the monitoring function based on the default group of search space sets until the processor determines another group of the plurality of groups of search space sets, depending on the downlink control channel, for performing the monitoring function.

According to a seventh aspect provided in addition to one of the first to sixth aspects, the processor, when determining to perform the monitoring function based on the default group of search space sets, further considers a channel occupancy status of the unlicensed spectrum of the radio cell by the base station, such that
 in case the channel occupancy status at the time subsequent to the non-monitoring time period is known to the UE, the processor determines to perform the monitoring function based on that group of search space sets that corresponds to the channel occupancy status subsequent to the non-monitoring time period, and
 in case the channel occupancy status at the time subsequent to the non-monitoring time period is not known to the UE, the processor determines to perform the monitoring function based on the default group of search space sets, and
 in case the channel occupancy status at the time subsequent to the non-monitoring time period is known to the UE, but the subsequent monitoring time period is caused by an uplink transmission intended by the UE, the processor determines to perform the monitoring function based on the default group of search space sets.

According to an eighth aspect provided in addition to one of the first to seventh aspects, the default group of search space sets is that group of search space sets that provides distributed monitoring occasions during a slot. In an optional implementation, a search space set is a set of search spaces, wherein each search space comprises one or multiple candidates of radio resources of the downlink control channel to be monitored.

According to a ninth aspect provided in addition to any one of the first to eighth aspects, the search space sets used for transmitting important system information to the UE are to be mandatorily monitored independently of which group of search space sets is determined by the processor. In an optional implementation, search space sets associated with a mandatory frequency resource bandwidth are to be mandatorily monitored by the monitoring function also during the non-monitoring time periods caused by a discontinued reception, DRX, function. In a further optional implementation, the important system information is a system information block 1 of a 5G NR standard communication system, and optionally wherein the mandatory frequency resource bandwidth is defined as a control resource set #0 of a 5G NR standard communication system.

According to a tenth aspect, a base station is provided comprising the following. A processor of the base station performs a control information transmission function that involves transmitting to a user equipment, UE, control information via a downlink control channel of an unlicensed radio cell based on one of a plurality of groups of search space sets. The base station controls the unlicensed radio cell that operates in an unlicensed spectrum. One of the plurality of groups of search space sets is configured to be a default group of search space sets. The processor determines one group of the plurality of search space sets groups for performing the control information transmission function. The control information transmission function is not performed during a non-monitoring time period of the UE. The UE does not perform a monitoring function that involves monitoring the downlink control channel during the non-monitoring time period. The processor determines to perform the control information transmission function based on the default group of search space sets, when performing the control information transmission function subsequent to the non-monitoring time period.

According to an eleventh aspect, provided in addition to the tenth aspect, the non-monitoring time period is at least one or more of:
   a sleep time period defined by a discontinued reception, DRX, cycle of a DRX function,
   a time period during which the UE performs radio measurements, and
   a time period during which the UE performs a transmission.

According to a twelfth aspect, provided in addition to the tenth or eleventh aspect, determining the one group of the plurality of search space sets groups for the control information transmission function is performed by the processor based on the channel occupation status of the unlicensed spectrum of the radio cell by the base station. In an optional implementation, the transmitter, when in operation, transmits an indication of the determined one group of search space sets via the downlink control channel, to the UE.

According to a thirteenth aspect, provided in addition to one of the tenth to twelfth aspects, the processor determines the default group of search space sets, and the transmitter transmits a configuration message to the UE to configure the UE with the determined default group of search space sets.

According to a fourteenth aspect, provided in addition to one of the tenth to thirteenth aspects, the processor, when determining to perform the control information transmission function based on the default group of search space sets, further considers a channel occupancy status of the unlicensed spectrum of the radio cell by the base station, such that
   in case the channel occupancy status at the time subsequent to the non-monitoring time period is known to the UE, the processor determines to perform the control information transmission function based on that group of search space sets that corresponds to the channel occupancy status subsequent to the non-monitoring time period, and
   in case the channel occupancy status at the time subsequent to the non-monitoring time period is not known to the UE, the processor determines to perform the control information transmission function based on the default group of search space sets, and
   in case the channel occupancy status at the time subsequent to the non-monitoring time period is known to the UE, but the subsequent monitoring time period is caused by an uplink transmission intended by the UE, the processor determines to perform the control information transmission function based on the default group of search space sets.

According to a fifteenth aspect, a method is provided comprising the following steps performed by a user equipment, UE.
   operating a monitoring function that involves monitoring of a downlink control channel of an unlicensed radio cell based on one of a plurality of groups of search space sets, the unlicensed radio cell operating in an unlicensed spectrum and being controlled by a base station that is in communication with the user equipment, wherein one of the plurality of groups of search space sets is configured to be a default group of search space sets,
   determining one group of the plurality of search space sets groups for performing the monitoring function, depending on the downlink control channel,
   wherein the monitoring function is not performed during a non-monitoring time period, and
   determining to perform the monitoring function based on the default group of search space sets, when performing the monitoring function subsequent to the non-monitoring time period.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment (UE) comprising:
a processor, which in operation, operates a monitoring function that involves monitoring of a downlink control channel of an unlicensed radio cell based on one of a plurality of groups of search space sets, the unlicensed radio cell operating in an unlicensed spectrum and being controlled by a base station that is in communication with the user equipment, wherein one of the plurality of groups of search space sets is configured to be a default group of search space sets, the processor, which in operation, determines one group of the plurality of search space sets groups for performing the monitoring function, depending on the downlink control channel,
wherein the monitoring function is not performed during a non-monitoring time period, and
the processor determines to perform the monitoring function based on the default group of search space sets, when performing the monitoring function subsequent to the non-monitoring time period.

2. The UE according to claim 1, wherein the non-monitoring time period is at least one or more of:
a sleep time period defined by a discontinued reception (DRX) cycle of a DRX function,
a time period during which the UE performs radio measurements, and
a time period during which the UE performs a transmission.

3. The UE according to claim 1, wherein determining the one group of the plurality of search space sets groups for the monitoring function, depending on the downlink control channel, is performed by the processor based on one or more of:
an indication of the one group of search space sets, obtainable from the downlink control channel,
detection of one signal on the downlink control channel, wherein the signal is one or more of a downlink control information message, a downlink data transmission, a downlink reference signal, and
the channel occupation status of the unlicensed spectrum of the radio cell by the base station, obtainable from the downlink control channel.

4. The UE according to claim 1, wherein a sleep time period of a discontinued reception (DRX) function is defined when the UE is not in Active time,
wherein the UE is in Active time at least during one or more of:
a monitoring time period defined by a DRX cycle,
a time period of inactivity, before an inactivity timer expires,
a time period during which the UE awaits the reception of a retransmission of a data packet,
a time period during which the UE waits so as to retransmit a data packet,
a time period during which the UE awaits resolution of a contention of a random access procedure,
a time period during which the UE awaits reception of a response to a scheduling request transmitted by the UE,
a time period during which the UE awaits for a downlink control channel transmission indicating a new transmission after reception of a random access response message of a contention-free random access procedure.

5. The UE according to claim 1, wherein the default group of search space sets is configured based on one or more of:
a configuration message received from the base station controlling the unlicensed radio cell, wherein the configuration message is a Radio Resource Control (RRC) message, or
predetermined information of the UE,
wherein the UE is connected to more than one base station, and wherein one default group of search space sets is configured per base station.

6. The UE according to claim 1, wherein the processor determines to perform the monitoring function based on the default group of search space sets until the processor determines another group of the plurality of groups of search space sets, depending on the downlink control channel, for performing the monitoring function.

7. The UE according to any of claim 1, wherein the processor, when determining to perform the monitoring function based on the default group of search space sets, further considers a channel occupancy status of the unlicensed spectrum of the radio cell by the base station, such that
in case the channel occupancy status at the time subsequent to the non-monitoring time period is known to the UE, the processor determines to perform the monitoring function based on that group of search space sets that corresponds to the channel occupancy status subsequent to the non-monitoring time period, and
in case the channel occupancy status at the time subsequent to the non-monitoring time period is not known to the UE, the processor determines to perform the monitoring function based on the default group of search space sets, and
in case the channel occupancy status at the time subsequent to the non-monitoring time period is known to the UE, but the subsequent monitoring time period is caused by an uplink transmission intended by the UE, the processor determines to perform the monitoring function based on the default group of search space sets.

8. The UE according to claim 1, wherein the default group of search space sets is that group of search space sets that provides distributed monitoring occasions during a slot,
wherein a search space set is a set of search spaces, wherein each search space comprises one or multiple candidates of radio resources of the downlink control channel to be monitored.

9. The UE according to claim 1, wherein the search space sets used for transmitting important system information to the UE are to be mandatorily monitored independently of which group of search space sets is determined by the processor,
wherein search space sets associated with a mandatory frequency resource bandwidth are to be mandatorily monitored by the monitoring function also during the non-monitoring time periods caused by a discontinued reception (DRX) function,
wherein the important system information is a system information block 1 of a 5G NR standard communication system, and wherein the mandatory frequency resource bandwidth is defined as a control resource set #0 of a 5G NR standard communication system.

10. A base station comprising:
a processor, which in operation, performs a control information transmission function that involves transmitting to a user equipment (UE) control information via a downlink control channel of an unlicensed radio cell based on one of a plurality of groups of search space sets, the base station controlling the unlicensed radio cell that operates in an unlicensed spectrum, wherein one of the plurality of groups of search space sets is configured to be a default group of search space sets,
the processor, which in operation, determines one group of the plurality of search space sets groups for performing the control information transmission function,
wherein the control information transmission function is not performed during a non-monitoring time period of the UE, wherein the UE does not perform a monitoring function that involves monitoring the downlink control channel during the non-monitoring time period, and the processor determines to perform the control information transmission function based on the default group of search space sets, when performing the control information transmission function subsequent to the non-monitoring time period.

11. The base station according to claim 10, wherein the non-monitoring time period is at least one or more of:
a sleep time period defined by a discontinued reception (DRX) cycle of a DRX function,
a time period during which the UE performs radio measurements, and
a time period during which the UE performs a transmission.

12. The base station according to claim 10, wherein determining the one group of the plurality of search space sets groups for the control information transmission function is performed by the processor based on:
the channel occupation status of the unlicensed spectrum of the radio cell by the base station,
wherein the transmitter, when in operation, transmits an indication of the determined one group of search space sets via the downlink control channel, to the UE.

13. The base station according to claim 10, wherein the processor, when in operation, determines the default group of search space sets, and the transmitter, when in operation, transmits a configuration message to the UE to configure the UE with the determined default group of search space sets.

14. The base station according to claim 10, wherein the processor, when determining to perform the control information transmission function based on the default group of search space sets, further considers a channel occupancy status of the unlicensed spectrum of the radio cell by the base station, such that
in case the channel occupancy status at the time subsequent to the non-monitoring time period is known to the UE, the processor determines to perform the control information transmission function based on that group of search space sets that corresponds to the channel occupancy status subsequent to the non-monitoring time period, and
in case the channel occupancy status at the time subsequent to the non-monitoring time period is not known to the UE, the processor determines to perform the control information transmission function based on the default group of search space sets, and
in case the channel occupancy status at the time subsequent to the non-monitoring time period is known to the UE, but the subsequent monitoring time period is caused by an uplink transmission intended by the UE, the processor determines to perform the control information transmission function based on the default group of search space sets.

15. A method comprising the following steps performed by a user equipment (UE):
operating a monitoring function that involves monitoring of a downlink control channel of an unlicensed radio cell based on one of a plurality of groups of search space sets, the unlicensed radio cell operating in an unlicensed spectrum and being controlled by a base station that is in communication with the user equipment, wherein one of the plurality of groups of search space sets is configured to be a default group of search space sets,
determining one group of the plurality of search space sets groups for performing the monitoring function, depending on the downlink control channel, wherein the monitoring function is not performed during a non-monitoring time period, and determining to perform the monitoring function based on the default group of search space sets, when performing the monitoring function subsequent to the non-monitoring time period.

\* \* \* \* \*